United States Patent
Koga et al.

(10) Patent No.: US 7,290,695 B2
(45) Date of Patent: Nov. 6, 2007

(54) FRICTION STIR WELDING APPARATUS

(75) Inventors: Shinji Koga, Kobe (JP); Masayuki Inuzuka, Ikeda (JP); Mitsuo Fujimoto, Kobe (JP); Hidehito Nishida, Kobe (JP); Yuzo Kano, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/493,037

(22) PCT Filed: Aug. 20, 2003

(86) PCT No.: PCT/JP03/10518

§ 371 (c)(1),
(2), (4) Date: Apr. 19, 2004

(87) PCT Pub. No.: WO2004/018141

PCT Pub. Date: Apr. 3, 2004

(65) Prior Publication Data

US 2005/0001010 A1 Jan. 6, 2005

(30) Foreign Application Priority Data

Aug. 20, 2002 (JP) .............................. 2002-239654

(51) Int. Cl.
*B23K 31/02* (2006.01)
(52) U.S. Cl. ..................................................... 228/2.1
(58) Field of Classification Search ............. 228/112.1, 228/2.1
See application file for complete search history.

(56) References Cited

U.S. PATENT DOCUMENTS

| | | | | |
|---|---|---|---|---|
| 1,694,555 A | * | 12/1928 | Naugle et al. ........... | 219/86.41 |
| 5,460,317 A | * | 10/1995 | Thomas et al. .......... | 228/112.1 |
| 6,247,633 B1 | * | 6/2001 | White et al. ............. | 228/112.1 |
| 6,299,048 B1 | * | 10/2001 | Larsson .................... | 228/2.1 |
| 6,364,197 B1 | * | 4/2002 | Oelgoetz et al. ......... | 228/112.1 |
| 6,540,128 B2 | * | 4/2003 | Hirano et al. ............ | 228/112.1 |
| 6,651,872 B2 | * | 11/2003 | Johnson et al. .......... | 228/264 |
| 6,676,004 B1 | * | 1/2004 | Trapp et al. .............. | 228/2.1 |
| 6,708,865 B2 | * | 3/2004 | Yoshinaga ............... | 228/112.1 |
| 2003/0029903 A1 | * | 2/2003 | Kashiki et al. .......... | 228/112.1 |
| 2004/0112939 A1 | * | 6/2004 | Nagao et al. ............. | 228/102 |
| 2004/0195290 A1 | * | 10/2004 | Nagao ...................... | 228/2.1 |

FOREIGN PATENT DOCUMENTS

| | | |
|---|---|---|
| JP | A-11-254147 | 9/1999 |
| JP | A-2001-314982 | 11/2001 |
| JP | A-2003-154472 | 5/2003 |

* cited by examiner

*Primary Examiner*—Kevin P. Kerns
(74) *Attorney, Agent, or Firm*—Oliff & Berridge, PLC

(57) ABSTRACT

The apparatus includes a base 23 fixed at a predetermine position, a tool holding jig 29, to which a welding tool 21 is mounted, installed on the base 23 rotatably about a preset reference axis L1 and movably along the reference axis L1, a tool rotation driving means for rotating the tool holding jig about the reference axis L1, and a tool movement driving means for moving the tool holding jig along the reference axis L1. The apparatus realizes miniaturization of the apparatus, simplification of the structure, and improvement of the operability.

11 Claims, 23 Drawing Sheets

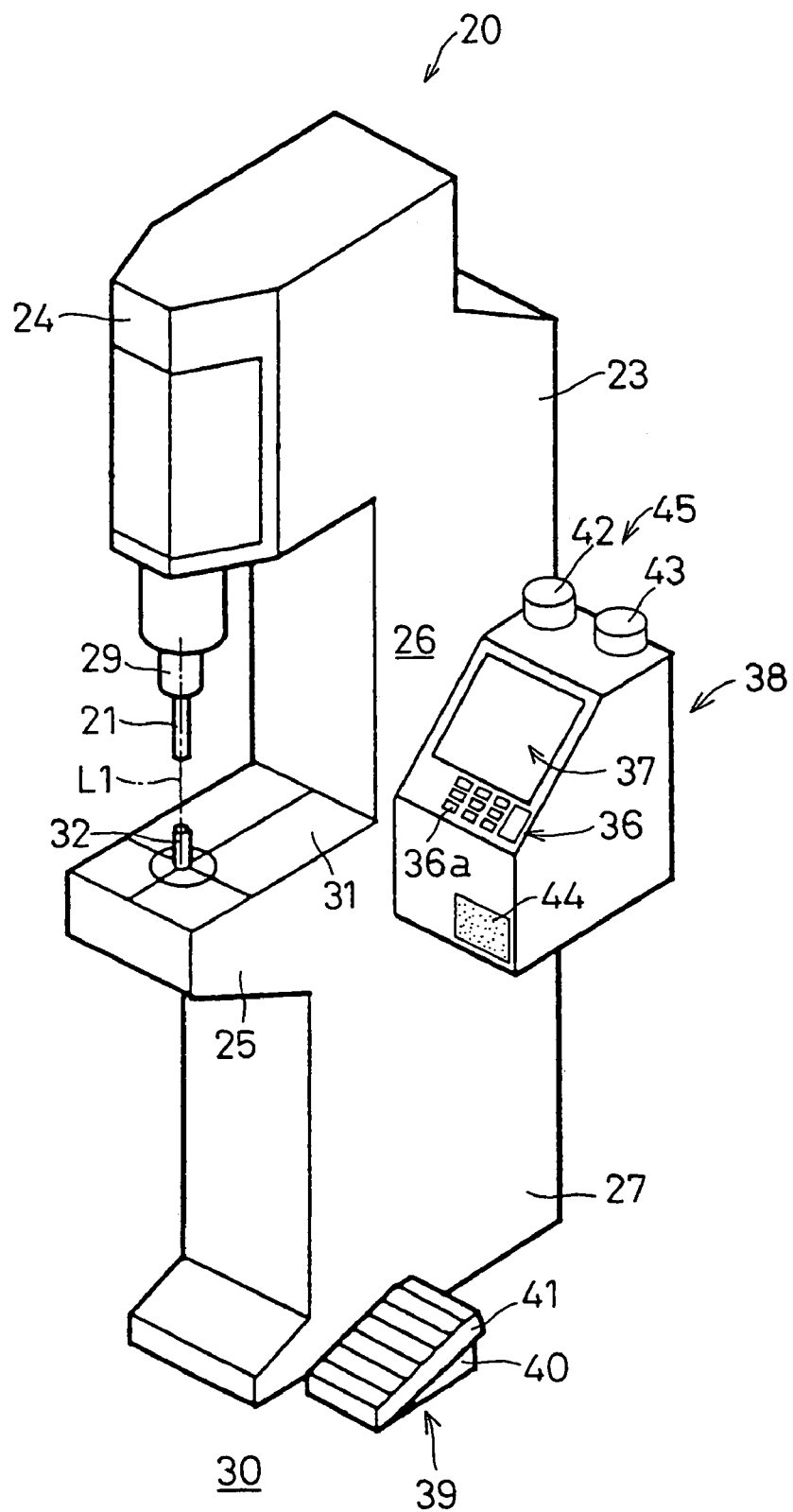
F I G. 1

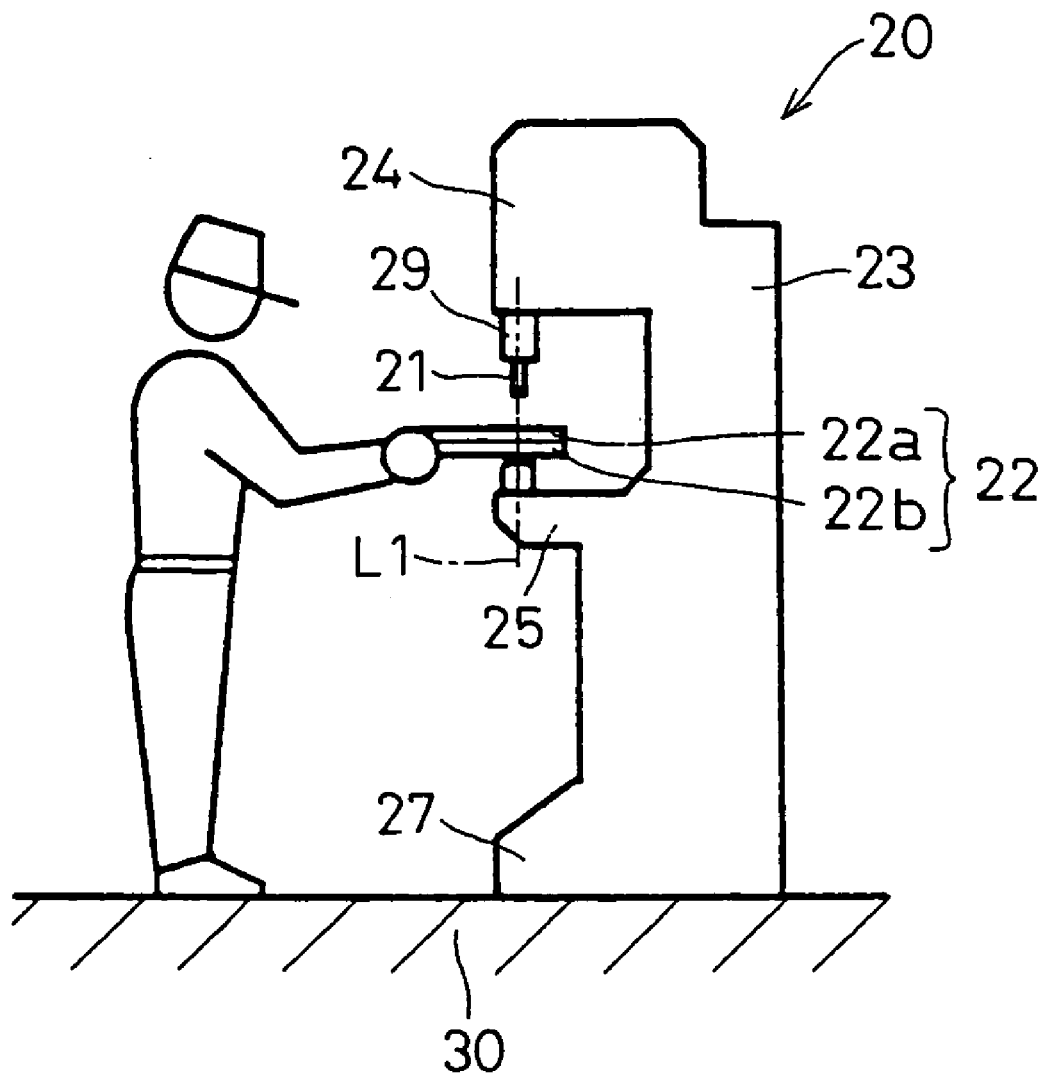
F I G. 2

F I G. 7A
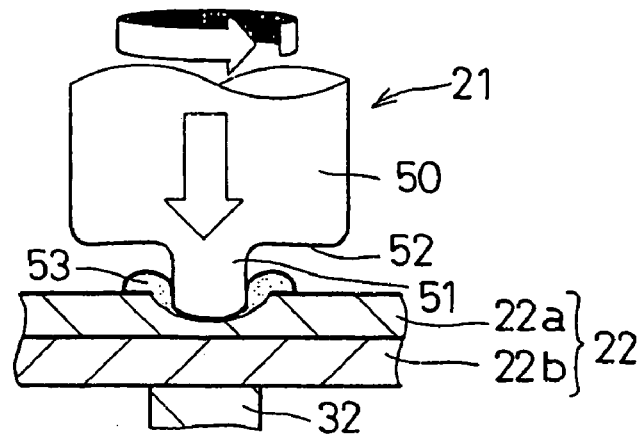
F I G. 7B
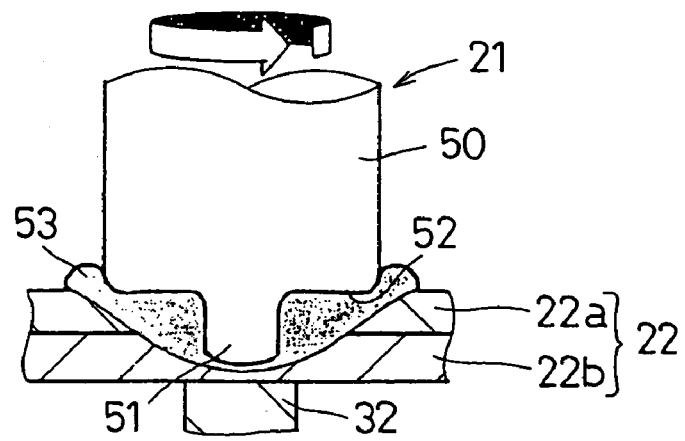
F I G. 7C
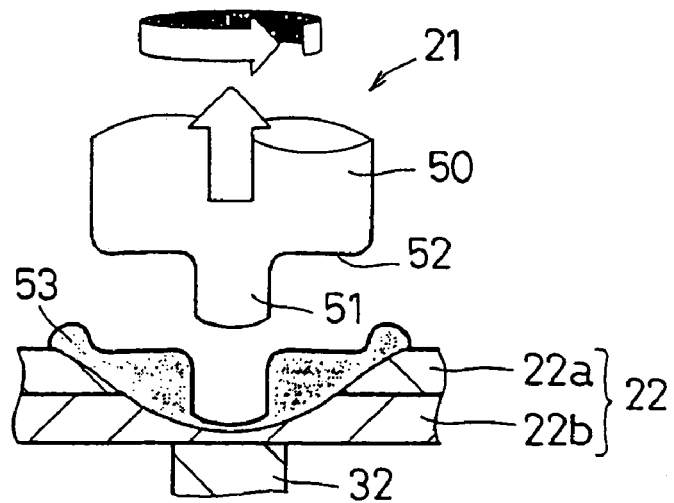

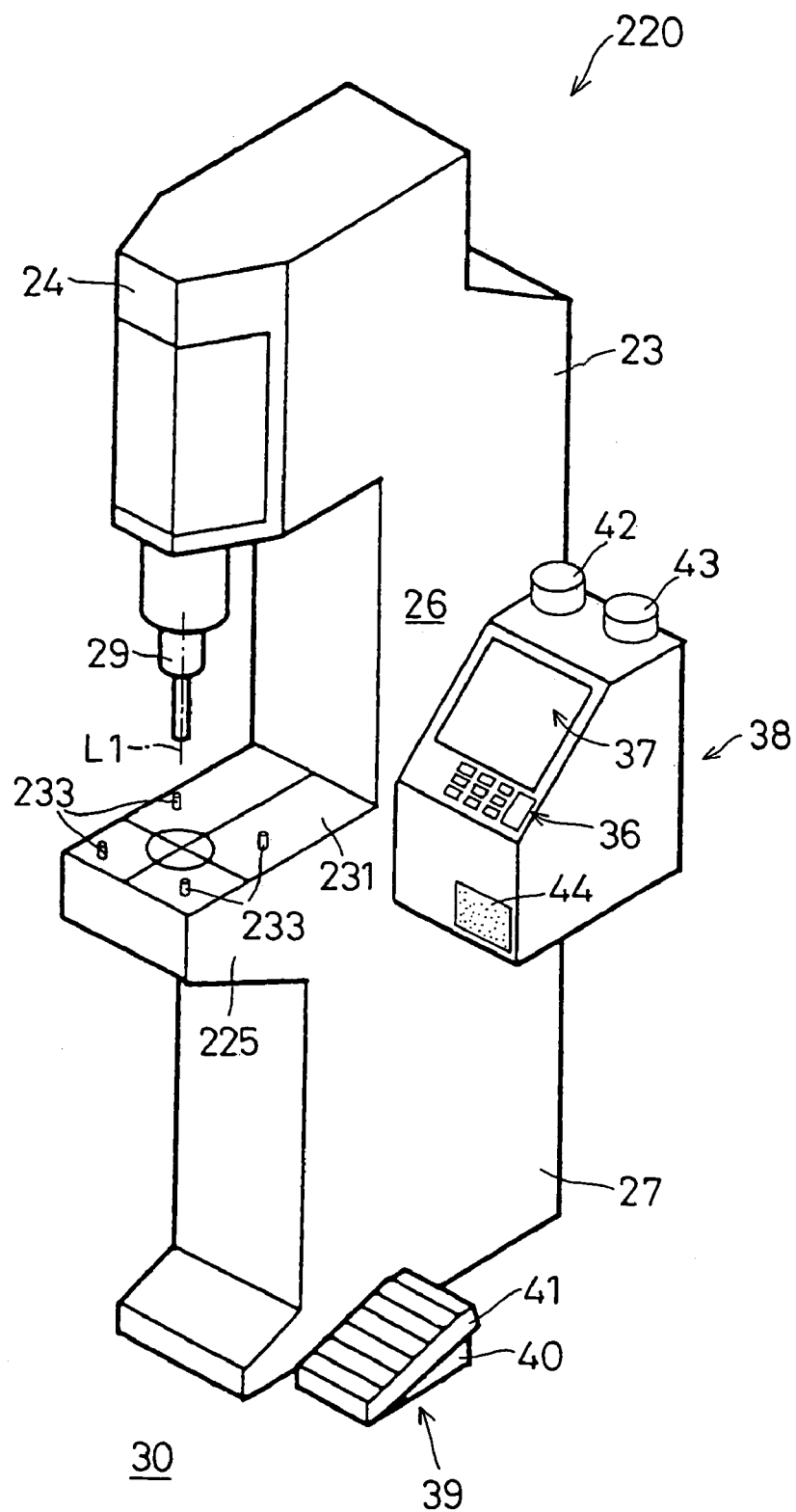
F I G. 13

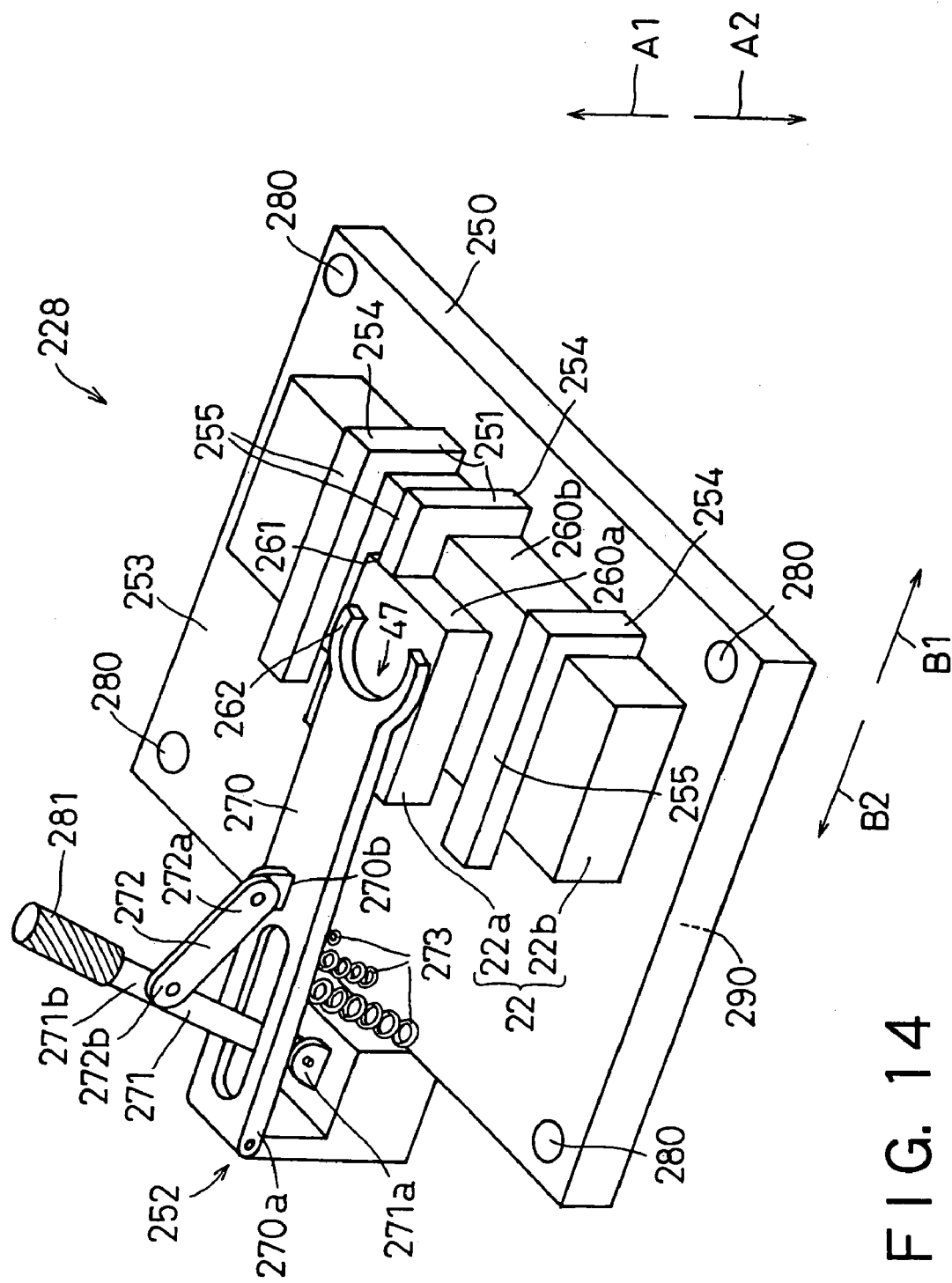
F I G. 14

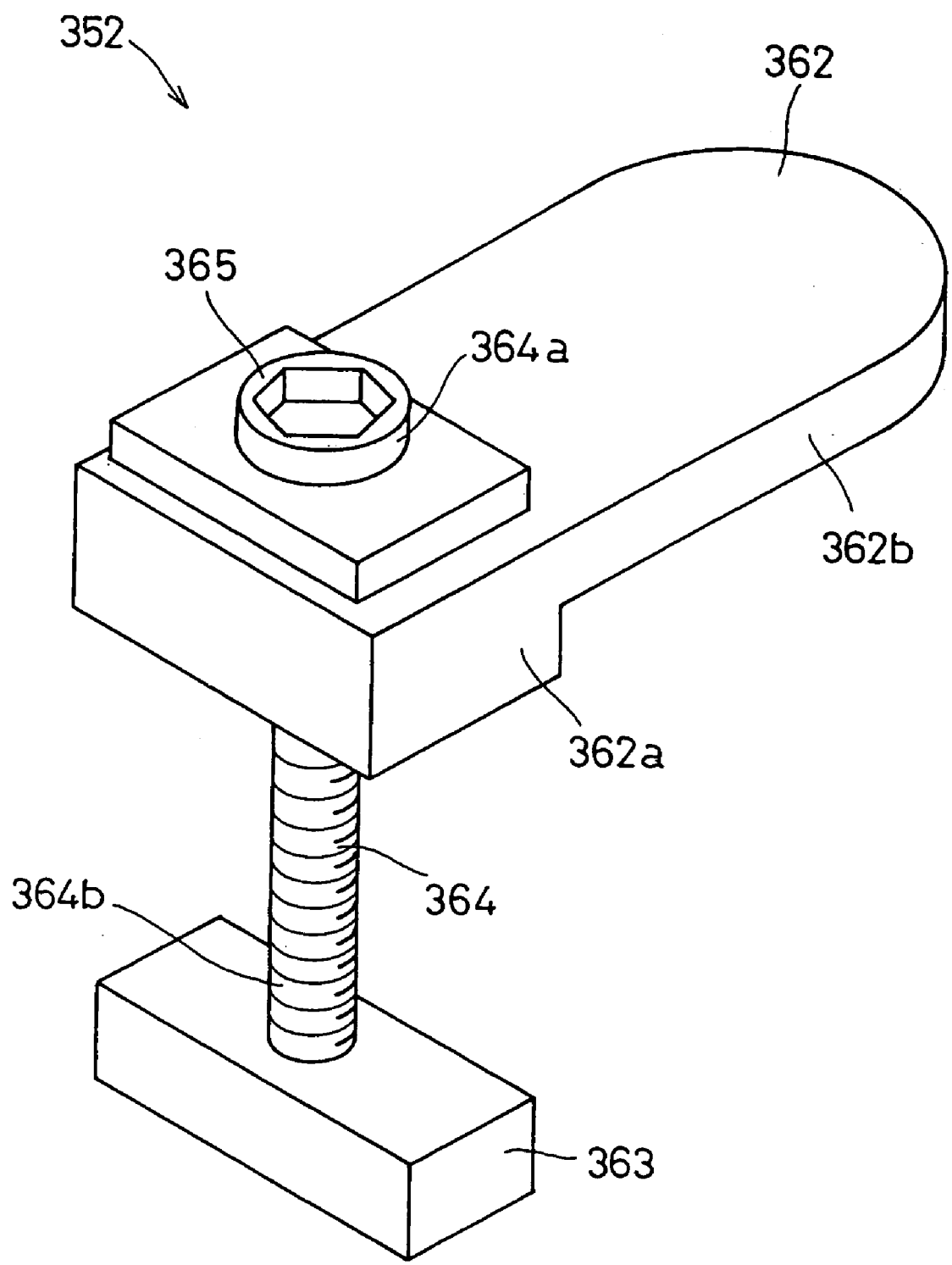
F I G. 16

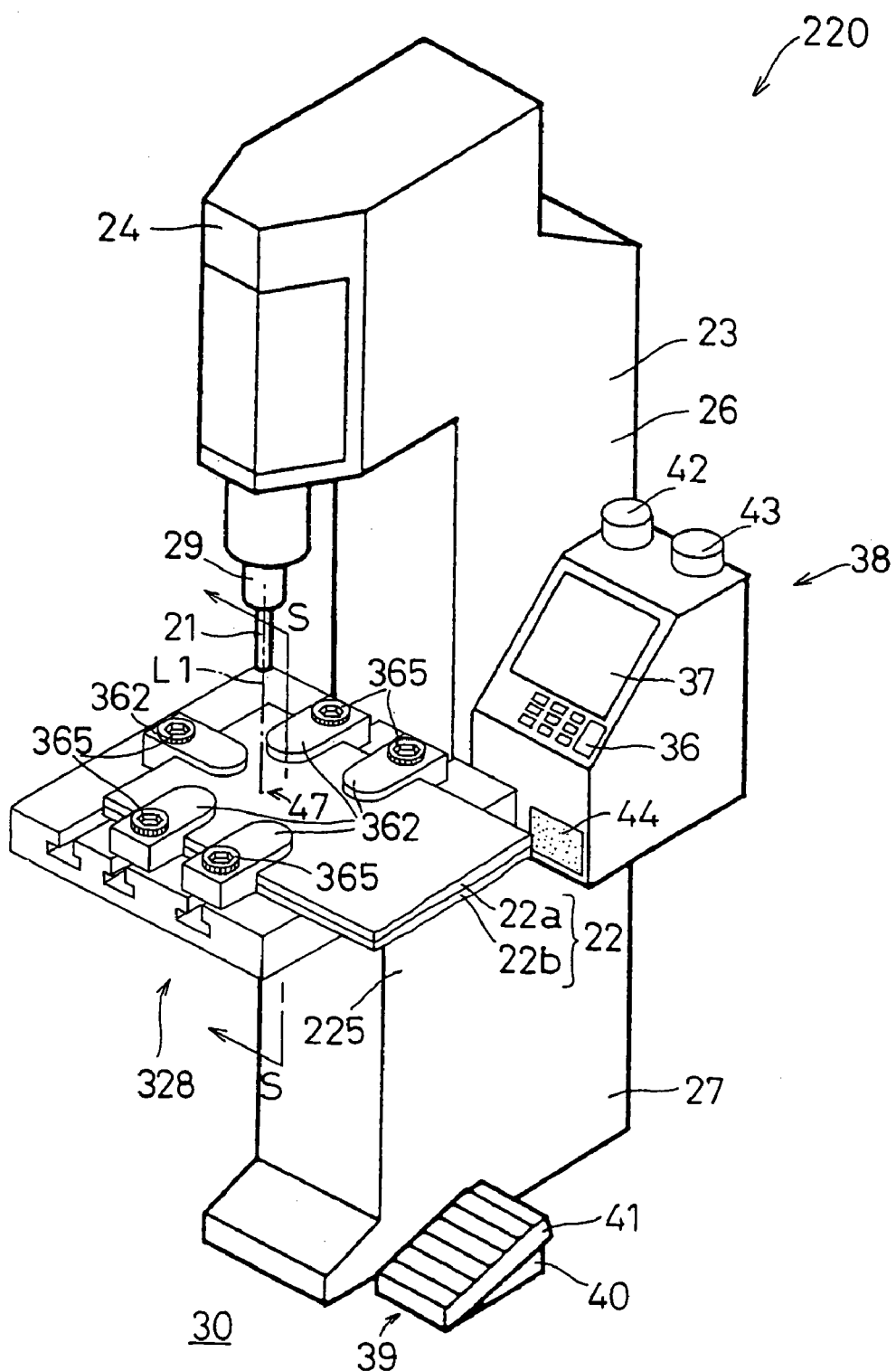
F I G. 17

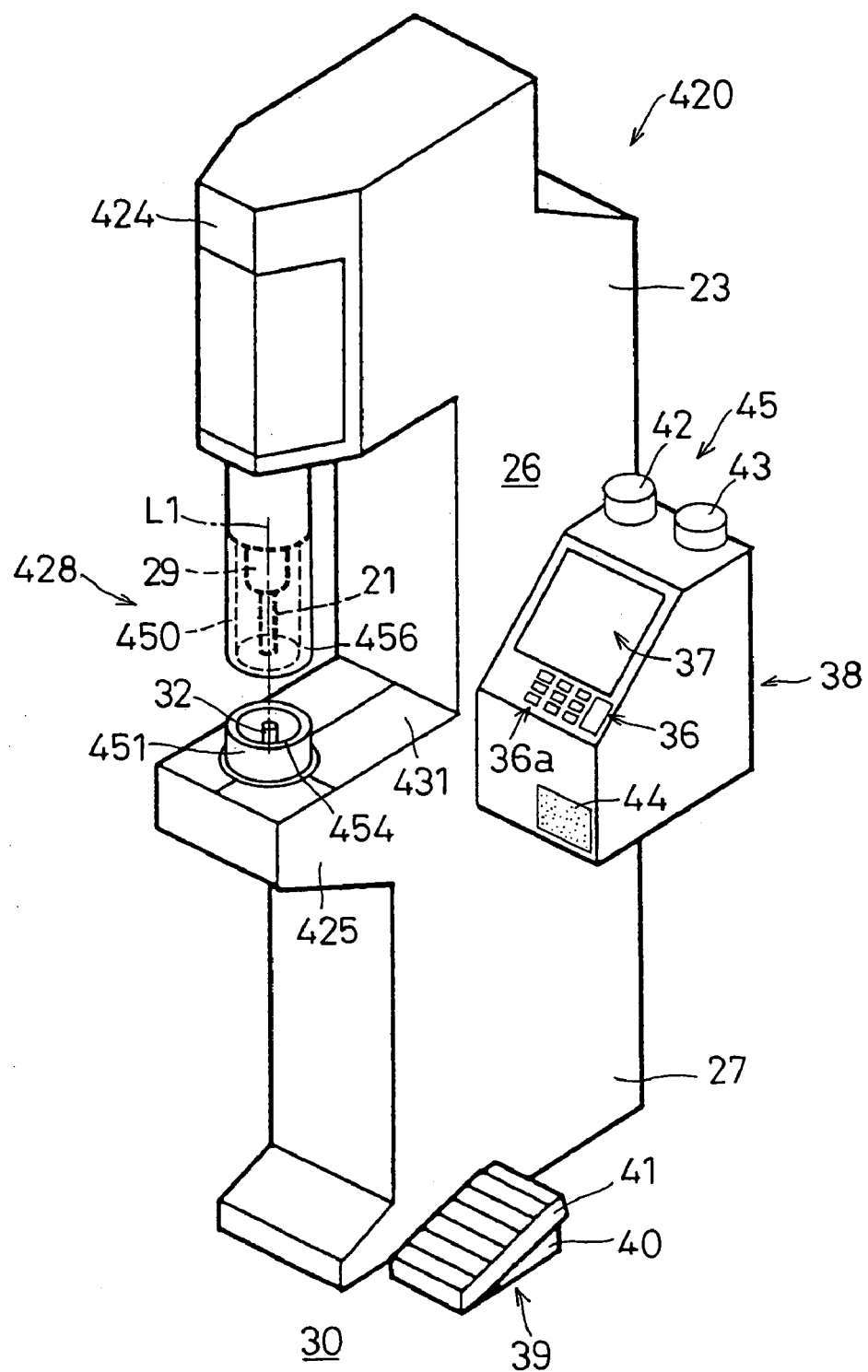
F I G. 20

F I G. 23A
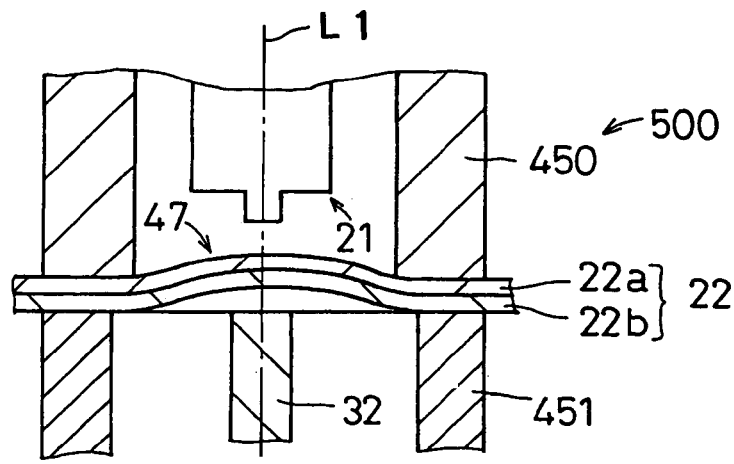
F I G. 23B
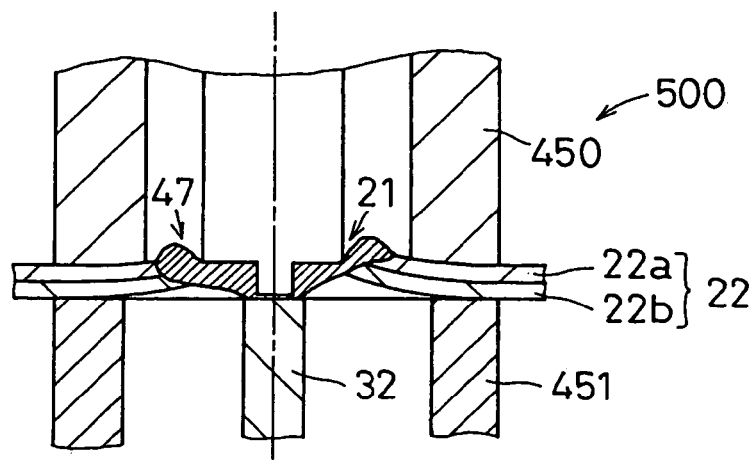

FRICTION STIR WELDING APPARATUS

TECHNICAL FIELD

The present invention relates to a friction stir welding apparatus for welding an object by a friction stir welding and more particularly to a friction stir welding apparatus suitably used for welding an object by a spot friction stir welding.

BACKGROUND ART

FIG. 25 is a drawing showing a friction stir welding apparatus 1 of the conventional art. The friction stir welding apparatus 1 includes a welding device 2 performing a welding operation and an arm 3 connected to the welding device 2 for positioning the welding device 2 for an object 4 to be welded. The welding device 2 is equipped with a tool holding jig 7 installed rotatably about a reference axis L1 and movably along the reference axis L1, a rotation motor for rotating the tool holding jig 7, and a displacement motor for moving the tool holding jig 7 along the reference axis L1. On the tool holding jig 7, a columnar welding tool 5 is mounted. The arm 3 may be made by a multi-joint robot and a tip 6 of the arm 3 is connected to the welding device 2.

The conventional friction stir welding apparatus 1 moves the welding device 2 toward the object 4 by the arm 3. Next, the apparatus 1 operates the welding tool 5 mounted to the tool holding jig 7 to rotate and make contact with the object 4. By doing this, frictional heat is generated in the object 4. The friction stir welding apparatus 1 makes the object 4 fluid by the frictional heat, stirs the object 4, and mixes and welds the boundary parts of two members 4a and 4b constituting the object 4 to be welded.

The aforementioned welding method using frictional heat is called friction stir welding (abbreviated to "FSW").

Conventionally, an object to be welded by the friction stir welding is a large object. Therefore, without moving a large object 4, it is welded by moving the welding device 2 by the arm 3.

The welding device 2 includes a rotation motor and a pressure motor. Therefore, the weight thereof is large such as about 120 kg. The arm 3 must be highly rigid in order to support the welding device 2. Further, when the moving distance of the welding device 2 is long, the arm 3 must be long. As mentioned above, in the friction stir welding apparatus 1, it is required to make the arm long and highly rigid, thus the necessary space occupied by the arm 3 is wider than that occupied by the welding device 2. Therefore, a problem arises that the structure becomes inevitably large. Further, in the friction stir welding apparatus 1, a moving space for the welding device 2 to move to the object 4 is required, so that a problem arises that a sufficiently large space for installation is necessary.

Further, the whole structure of the friction stir welding apparatus is complicated due to the arm 3, thereby, a problem arises that the maintenance and adjustment are difficult. Further, according to the shape of the object 4, an operator should perform both the teaching operation and the exchange operation of a welding tool, thereby, a problem arises that the workability is lowered.

Therefore, the present invention is intended to provide a friction stir welding apparatus which has a simple constitution and a good operability, and can be miniaturized.

DISCLOSURE OF INVENTION

The friction stir welding apparatus of the present invention comprises: a base fixed at a predetermine position; a tool holding jig to which a welding tool is mounted, the tool holding jig being installed on the base rotatably about a reference axis and movably along the reference axis; tool rotation driving means for rotating the tool holding jig about the reference axis; and tool movement driving means for moving the tool holding jig along the reference axis.

According to the present invention, an object to be welded is positioned on the base fixed at the predetermined position and the welding tool is mounted on the tool holding jig. In this state, the holding jig is rotated about the reference axis and moved along the reference axis. The welding tool mounted on the tool holding jig is driven together with the tool holding jig, thus the welding tool rotates and makes contact with the object to be welded. By doing this, frictional heat is generated on the object to be welded, and the object is made fluid, and the welding tool is buried in the object. When the welding tool is buried up to the neighborhood of the respective boundary parts of a plurality of members constituting the object to be welded, the fluid boundary parts can be respectively stirred and mixed. By doing this, the plurality of members constituting the object to be welded can be welded to each other.

When the base is fixed and the object to be welded is positioned on the base like this, the aforementioned arm which is necessary in the conventional art becomes unnecessary. By doing this, the apparatus can be miniaturized, and the structure thereof can be simplified, thus the manufacturing cost can be reduced. Further, the base does not move so that the installation space can be made smaller.

As mentioned above, a friction stir welding apparatus which is inexpensive and occupies only a small installation space can be structured, so that even a user who is short of funds and has only a small installation space such as a small and medium-sized enterprise can introduce the friction stir welding apparatus.

Further, since the base is fixed, the teaching operation of adjusting the moving position of the base is not required and the exchange operation of the welding tool can performed easily. By doing this, the friction stir welding apparatus, even when object to be welded are low-volume and high-variety products, can prevent the workability from lowering. Further, vibration of the tool holding jig, which could be caused when the base is moved, can be eliminated. Further, for example, an operator positions an object to be welded, thereby can weld the object at any optional position, can easily change the welding position according to the abject to be welded, and can flexibly respond according to the object to be welded.

Further, as long as the tool rotation driving means and the tool movement driving means transfer drive force to the tool holding jig, there is no need to install all of the tool rotation driving means and the tool movement driving means on the base. Therefore, a part of the tool rotation driving means and the tool movement driving means can be installed separately from the base, thus they can be designed easily. Further, the base is fixed without moving, so that there is a little limit to the designed weight.

Further, it is preferable that the friction stir welding apparatus of the present invention further comprises positioning means, which is installed on the base, for positioning an object to be welded with respect to the reference axis.

According to the present invention, an object to be welded is positioned with respect to the reference axis by the positioning means. By doing this, the object to be positioned on the base can be prevented from displacement and the positioning operation of the object to be welded can be performed surely and simply.

For example, when an object to be welded is to be moved by an operator, there is the possibility that the object is shifted from the position to be positioned. However, since the positioning means is installed, the displacement of the object to be welded can be prevented. By doing this, the object to be welded can be correctly positioned, and the time required for positioning the object to be welded can be shortened, and the number of objects to be welded per unit time can be increased.

Further, in the friction stir welding apparatus of the present invention, it is preferable that the positioning means positions holding means for holding the object to be welded with respect to the base.

According to the present invention, the holding means is positioned on the base by the positioning means, thus the object to be welded is positioned with respect to the reference axis. Therefore, even an object which is difficult to be positioned can be easily positioned by positioning in the state that it is held by the holding means.

Further, when the welding operation is performed in the state that the object to be welded is held, the object can be prevented from shifting, displacing and deforming during welding. By doing this, the welding quality of the object can be improved.

Further, when the welding tool rotates and makes contact with the object to be welded, force for moving the object is applied and there is the possibility that the object may be raised to high temperature due to frictional heat. When the welding operation is performed in the state that the object is held by the holding means, the operator himself does not need to hold the object to be welded. By doing this, the danger of contact of the operator himself with the rotation tool during rotation is eliminated, thus the safety can be improved. Further, even when it is difficult for the operator himself to hold the object to be welded, the operator himself does not need to hold the object by the holding means and the convenience can be enhanced.

Further, it is preferable that the friction stir welding apparatus of the present invention further comprises holding means, which is installed on the base, for holding an object to be welded.

According to the present invention, the welding operation is performed in the state that an object to be welded is held by the holding means installed on the base. The holding means installed on the base holds the object to be welded on the base. The welding operation is performed in the state that the object to be welded is held on the base, thus the object can be prevented from shifting, displacing and deforming during welding. By doing this, the welding quality of the welded part can be improved.

Further, when the welding tool rotates and makes contact with the object to be welded, force for moving the object is applied and there is the possibility that the object may be raised to high temperature due to frictional heat. When the welding operation is performed in the state that the object to be welded is held by the holding means, the operator does not need to hold the object and the convenience can be enhanced.

Further, in the friction stir welding apparatus of the present invention, it is preferable that the holding means has a backing member for supporting a part of the object located on the reference axis from a side opposite to the welding tool.

According to the present invention, the welding tool rotates and makes contact with the object to be welded in the state that the object is supported by the backing member. Even if the part of the object on the reference axis is pressed by the welding tool, the back side part of the part pressed by the welding tool is supported by the backing member, so that it is prevented from deformation. By doing this, defective welding due to deformation of the object to be welded can be prevented and the welding quality can be improved.

Further, in the friction stir welding apparatus of the present invention, it is preferable that the holding means comprises: a first clamping piece installed movably along the reference axis with respect to the base and the tool holding jig; clamping piece movement driving means for moving the first clamping piece along the reference axis; a second clamping piece for holding the object cooperatively with the first clamping piece, the second clamping piece being installed so that the second clamping piece can move along the reference axis from a projection position projecting over the backing member and a retraction position retracting with respect to the backing member; and spring force generation means for giving spring force toward the projection position to the second clamping piece.

According to the present invention, in the state that an object to be welded is arranged on the second clamping piece at the projection position, the first clamping piece is moved and driven toward the second clamping piece by the clamping piece driving means. By doing this, the interval between the first clamping piece and the second clamping piece is narrowed and the first clamping piece makes contact with the object to be welded. Furthermore, when the first clamping piece is moved and driven toward the backing member against the spring force given to the second clamping piece, the object to be welded can be clamped by the first clamping piece and second clamping piece.

In the state that the object to be welded is clamped by the first and second clamping pieces, the first clamping piece is additionally moved toward the backing member, thus the object to be welded can be moved toward the backing member and the object can be supported by the backing member.

In the state that the object to be welded is clamped by the first and second clamping pieces like this, when the welding operation is performed, the welding operation can be performed in the state that the object to be welded is held. Further, when the object to be welded is supported by the backing member, the welding operation can be performed in the state that the object to be welded is prevented from deformation. By doing this, the object to be welded can be prevented from deformation and displacement during welding and the welding quality can be improved. Further, when the welding is finished, the clamping piece driving means is operated so as to separate the first clamping piece from the object, thus the first clamping piece is separated from the second clamping piece, and the object can be easily released from the holding state. The holding and release of the object can be easily switched like this and the welding operation can be performed in a short time.

Further, in the friction stir welding apparatus of the present invention, it is preferable that the first clamping piece is formed so that a center axis thereof is coaxially with the reference axis; the second clamping piece is formed so that a center axis thereof is coaxially with the reference axis; and the object is clamped by an end face of the first clamping piece and an end face of the second clamping piece.

Further, it is preferable that the first clamping piece and the second clamping piece are formed in a cylindrical or hollow shape, respectively.

Further, in the friction stir welding apparatus of the present invention, it is preferable that the backing member is installed movably along the reference axis; and backing member movement driving means for moving the backing member along the reference axis is installed in place of the tool movement driving means.

BRIEF DESCRIPTION OF DRAWINGS

FIG. 1 is a perspective view showing the friction stir welding apparatus as an embodiment of the present invention.

FIG. 2 is a drawing schematically showing the stir welding operation using the friction stir welding apparatus shown in FIG. 1.

FIGS. 7A, 7B, and 7C are sectional views for explaining the procedure of the welding operation of the friction stir welding apparatus shown in FIG. 1.

FIG. 13 is a perspective view showing the friction stir welding apparatus of still another embodiment of the present invention.

FIG. 14 is a perspective view showing the holding jig mounted on the friction stir welding apparatus shown in FIG. 13.

FIG. 16 is a perspective view showing the clamping part of the holding jig shown in FIG. 15.

FIG. 17 is a perspective view showing the friction stir welding apparatus shown in FIG. 13 in the state that the holding jig shown in FIG. 15 is mounted.

FIG. 20 is a perspective view showing the friction stir welding apparatus of a further embodiment of the present invention.

FIGS. 23A and 23B are sectional views showing the holding means of a comparison example different from the embodiment of the present invention.

BEST MODE FOR CARRYING OUT THE INVENTION

Figure 3:
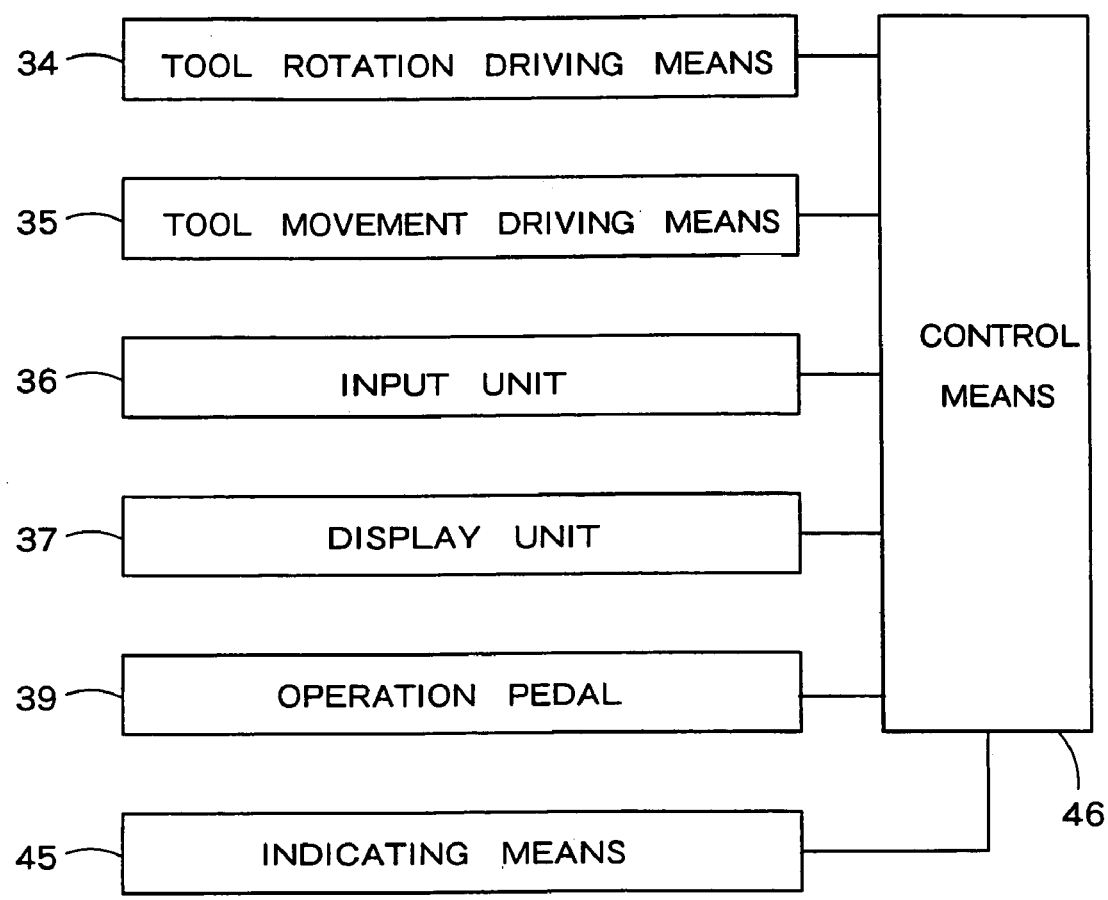
FIG. 3 is a block diagram showing the electrical constitution of the friction stir welding apparatus shown in FIG. 1.

A friction stir welding apparatus 20 as an embodiment of the present invention which are shown in FIGS. 1 and 2, in the state that an object to be welded 22 is positioned on a base 23 by an operator, is an apparatus of frictionally stirring and welding the object 22, which is particularly used in spot welding. For example, the friction stir welding apparatus 20 is used to manufacture thin and medium-thin aluminum products and it is used to manufacture car bodies, boxes, design structures, and other stacked objects to be welded.

The friction stir welding apparatus 20 makes a columnar welding tool 21 rotate and come into contact with the object 22, presses the same against the object 22, and causes frictional heat between the welding tool 21 and the object 22. Next, the friction stir welding apparatus 20 makes the object 22 fluid by frictional heat and buries the welding tool 21 into the object 22. The welding tool 21 is buried up to the neighborhood of the respective boundary parts of a plurality of members 22a and 22b to be welded constituting the object 22. In this state, the welding tool stirs the fluid object 22, thereby mixes the boundary parts of the members 22a and 22b, and welds the members 22a and 22b to each other.

The base 23 of the friction stir welding apparatus 20 is installed in a predetermined position. The base 23 includes a head 24 for installing a tool holding jig 29 on which the welding tool 21 is removably mounted, a table 25 installed opposite to the head 24 at some interval, a column 26 for supporting both the head 24 and the table 25, and a base part 27 connected to the column 26 and fixed at the installation position.

According to this embodiment, the base part 27 is fixed to the installation part of a floor 30 which is a fixed position. Further, the column 26 is extended from the base part 27 upward vertically. Further, the head 24 and the table 25 are projected horizontally from the column 26.

The tool holding jig 29 installed in the head 24 is installed rotatably about a predetermined reference axis L1 and is installed movabily and drivably along the reference axis L1. For example, the predetermined reference axis L1 is extended vertically and passes the center axis of the tool holding jig 29. The head 24 has a drive force transfer mechanism for driving the tool holding jig 29 and drive force from a tool rotation driving means 34 (FIG. 3) and a tool movement driving means 35 (FIG. 3), which will be described later, is given to the tool holding jig 29.

The table 25 has an opposing face 31 which is perpendicular to the reference axis L1 and opposite to the tool holding jig 29. Further, in the table 25, a backing member 32 projecting from the opposing face 31 toward the tool holding jig 29 is formed. The backing member 32, for example, is formed in a cylindrical shape and the center axis thereof is arranged coaxially with the reference axis L1.

On the friction stir welding apparatus 20, the tool rotation driving means 34 for rotating the tool holding jig 29 about the reference axis L1 and the tool movement driving means 35 for moving the tool holding jig 29 along the reference axis L1 are installed. In this embodiment, the driving means 34 and 35 are built in the base 23, and for example, they are made so as to include a servo motor. The driving means 34 and 35 drive the tool holding jig 29 via a drive force transfer mechanism installed in the head 24.

Further, the friction stir welding apparatus 20 is equipped with a controller 38 including an input unit 36 for inputting welding conditions for frictional stirring and welding and a display unit 37 for displaying the welding conditions and an operation pedal 39 for outputting a welding start instruction from an operator. The input unit 36 has a plurality of buttons 36a. The input unit 36, when the buttons 36a are operated, outputs conditions given by the operator.

The controller 38 is installed in a position where an operator can easily operate and recognize. For example, the controller 38 is installed in the neighborhood of the base 23 and when he is to perform the welding operation, it is installed within his reach when he stretches his arm during his welding operation and at a position away from the displacement area of the welding tool 29 where there is no danger even if he operates the input unit 36 during his welding operation.

Further, the controller 38 has an indicating means 45 for indicating the operation state of the friction stir welding apparatus. The indicating means 45, for example, includes an end lamp 42 lighting when the welding operation ends, an error lamp 43 lighting when a welding operation error is caused, and a speaker 44 sounding the welding operation state.

Further, the operation pedal 39 has a bottom 40 installed on the floor 30 and a plate-shaped foot-operated lever 41 installed vertically movably. The foot-operated lever 41 is given spring force applied upward by a spring. The operation pedal 39, when the foot-operated lever 41 is stepped on by an operator and is moved downward, outputs a welding start instruction signal. Further, when he releases his foot from the foot-operated lever 41, it is moved upward and the welding start instruction signal is outputted.

FIG. 3 is a block diagram showing the electrical constitution of the friction stir welding apparatus 20. The friction stir welding apparatus 20 additionally has a control means 46 for controlling the respective means constituting the friction stir welding apparatus 20.

The tool rotation driving means 34, on the basis of a signal given from the control means 46, decides the rotational speed and rotational time and rotates the tool holding jig 29. Further, the tool rotation driving means 34 detects load torque necessary to rotate the tool holding jig 29 at a predetermined rotational speed and gives a signal indicating the load torque to the control means 46. The load torque is obtained, for example, on the basis of a load current flowing in the rotation motor constituting the tool rotation driving means 34. Further, the tool rotation driving means 34 may give a signal indicating the state under welding, for example, the rotational speed to the control means 46. The control means 4 may give the rotational speed during the welding operation and the load torque to the display unit 37 to display the values.

The tool movement driving means 35, on the basis of a signal given from the control means 46, decides the moving speed and moving time and moves the tool holding jig 29. Further, the tool movement driving means 35 detects load torque necessary to move the tool holding jig 29 at a predetermined moving speed and gives a signal indicating the load torque to the control means 46. The load torque is obtained, for example, on the basis of a load current flowing in the movement motor constituting the tool movement driving means 35. Further, the tool movement driving means 35 may give a signal indicating the state under welding, for example, the moving speed to the control means 46. The control means 4 may give the moving speed during the welding operation and the load torque to the display unit 37 to display the values.

The input unit 36 outputs the welding conditions relating to the friction stir welding operation inputted from the operator and gives it to the control means 46. Further, the control means 46 gives the welding conditions to the display unit 37 to display them. Tables 1 and 2 indicate examples of the welding conditions.

TABLE 1

|  | Welding time (s) | Pressure (N) | Rotational Speed (rpm) |
|---|---|---|---|
| 1st stage condition | 0.5 | 4000 | 3000 |
| 2nd stage condition | 1.0 | 3500 | 2500 |
| 3rd stage condition | 0.3 | 2000 | 3000 |

TABLE 2

|  | Welding time (s) | Descending Speed (m/s) | Rotational Speed (rpm) |
|---|---|---|---|
| 1st stage condition | 0.5 | 5.0 | 3000 |
| 2nd stage condition | 1.0 | 0.5 | 2500 |
| 3rd stage condition | 0.3 | 0.0 | 3000 |

For example, as indicated in Table 1, the welding conditions include three conditions such as welding time, pressure, and rotational speed. Further, as indicated in Table 2, in place of the pressure, the descending speed of the tool holding jig 29 may be defined as a condition.

The welding time is the time required for the tool holding jig 29 to rotate at a preset pressure or descending speed and a preset rotational speed. The pressure is the pressure for pressing the tool holding jig 29 toward the backing member 32 and the descending speed is the speed of the tool holding jig 29 moving toward the backing member 32. The rotational speed is the speed of the tool holding jig 29 to rotate about the axis and for example, it is set by the number of revolutions per minute.

As indicated in Tables 1 and 2, the welding conditions can be at a multistage. Namely, in the course of time, the pressure, descending speed, and rotational speed can be set changeably.

Further, after welding, the speed of the tool holding jig 29 to separate from the object 22 and the rotational speed at that time may be input.

Table 3 shows an example of the plate thickness of the object to be welded 22. Further, the plate thickness of the object 22 may be inputted from the input unit 36 to the control means 46. As conditions of the object to be welded 22, for example, when three members are to be welded, the thickness of the upper plate on the side of the tool holding jig 29; the thickness of the medium plate neighboring the upper plate on the side of the backing member 32, and the thickness of the lower plate neighboring the medium plate on the side of the backing member 32 may be inputted to set the total plate thickness of the object to be welded 22. However, the number of members constituting the object 22 is not limited to three and the total plate thickness of the object 22 is set according to the number of members.

TABLE 3

|  | Upper plate thickness (mm) | Medium plate thickness (mm) | Lower plate thickness (mm) | Total plate thickness (mm) |
| --- | --- | --- | --- | --- |
| Object to be welded | 1.0 | 1.2 | 1.2 | 3.4 |

Figure 6A:
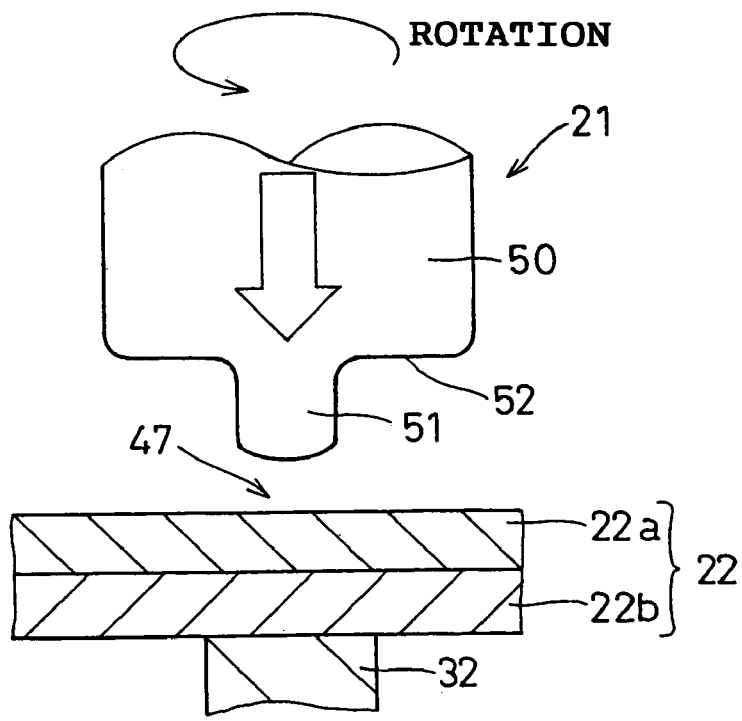
FIGS. 6A and 6B are sectional views for explaining the procedure of the welding operation of the friction stir welding apparatus shown in FIG. 1.
Figure 6B:
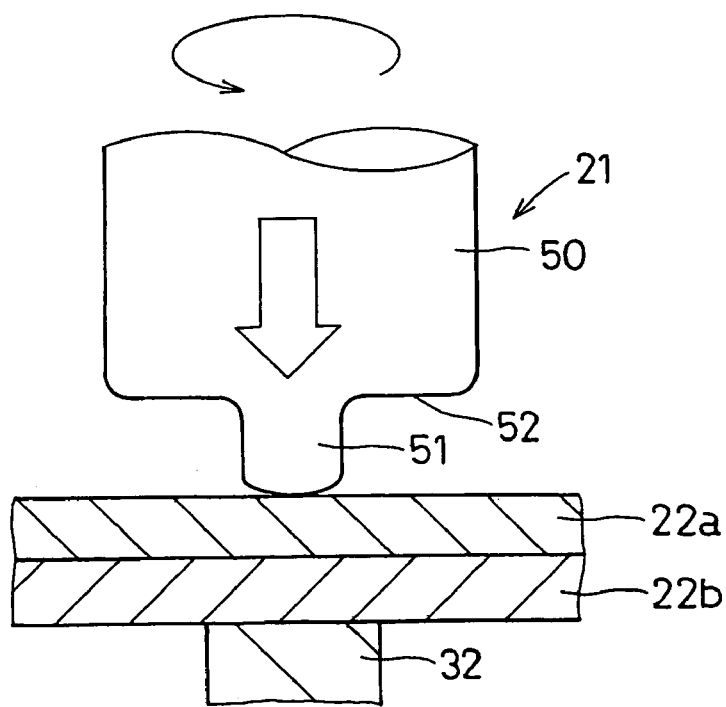

Table 4 indicates the pin shape of the welding tool 21. Further, the shape of the welding tool 21 may be inputted from the input unit 36 to the control means 46. For example, the welding tool 21, as shown in FIGS. 6A and 6B, has a tool body 50, which is formed in a columnar shape and has a flat shoulder face 52 at its end, and a columnar pin 51 projected from the shoulder face 52. The center axis of the tool body 50 and the center axis of the pin 51 are positioned coaxially. Table 4 indicates the pin shape of the welding tool 21. For example, the pin length end pin diameter of the welding tool 21 as indicated in the table are set.

TABLE 4

|  | Pin length (mm) | Pin diameter (mm) |
| --- | --- | --- |
| Welding tool conditions | 2.5 | 3.0 |

The control means 46 may have a memory for storing the welding conditions. For example, any of a plurality of welding conditions stored in the memory beforehand is selected by an operator and on the basis of the selected welding condition, the control means 46 may control the other respective means.

Further, the operation pedal 39 outputs a welding start instruction signal and welding stop instruction signal to the control means 46. The control means 46, on the basis of the signals given from the operation pedal 39 and signals given from the tool driving means 34 and 35, controls the indicating means 45. Concretely, the control means 46 turns on and off the end lamp 42 and the error lamp 43 and sounds the operation state from the speaker 44.

Figure 4:
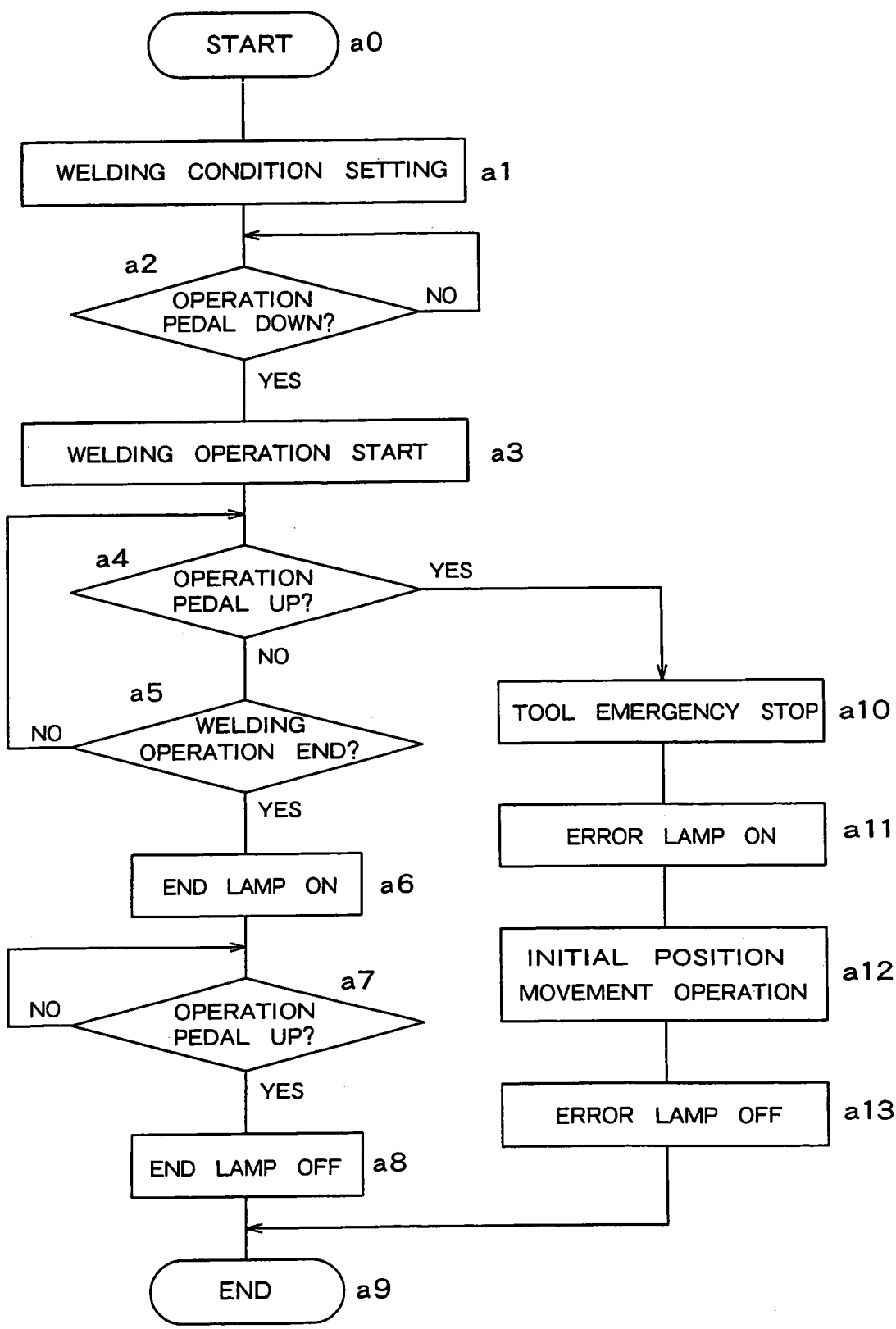
FIG. 4 is a flow chart showing the operation procedure of the control means of the friction stir welding apparatus shown in FIG. 1.

FIG. 4 is a flow chart showing the operation procedure of the control means 46. When the preparations for friction stir welding, such as mounting the welding tool 21 to the tool holding jig 29, are set up, the control means 46 goes to Step a1 and starts the operation.

At Step a1, the control means 46 is given the conditions for friction. stir welding from the input unit 36. The control means 46 generates instruction signals for operating the tool rotation driving means 34 and the tool movement driving means 35 according to the welding conditions and goes to Step a2.

At Step a2, the control means 46 judges whether a welding start instruction signal is given from the operation pedal 39 or not. When the welding start instruction signal is given, the control means 46 judges that the operator is ready for operation and goes to Step a3, At Step a3, the control means 46 gives a signal generated according to the welding conditions to the tool rotation driving means 34 and the tool movement driving means 35, starts the welding operation by the driving means 34 and 35, and goes to Step a4.

At Step a4, the control means 46 judges whether a welding stop instruction signal is given from the operation pedal 39 or not. When the welding stop instruction signal is given, the control means 46 judges that the operator is separated from the neighborhood of the apparatus and goes to Step a10. Further, when the welding stop instruction signal is not given, the control means 46 goes to Step a5.

At Step a5, the control means 46, on the basis of the set welding operation time, judges whether the welding operation is finished or not. When the control means 46 judges that the welding operation is not finished, it goes to Step a4.

The control means 46, until it judges that the welding operation is completed, repeats Steps a4 and a5 and when it judges that the welding operation is completed, it goes to Step a6.

At Step a6, the control means 46 controls the end lamp 42 so as to light and goes to Step a7.

At Step a7, when the welding stop instruction signal is given from the operation pedal 39, the control means 46 judges that the operator finishes the welding operation and goes to a8.

At Step a8, the control means 46 controls the end lamp 42 so as to go out. When the end lamp 42 goes out, the control means goes to Step a9.

At Step a9, the control means 46 ends the operation.

Further, at Step a4, when the welding stop instruction signal is given from the operation pedal 39 during the welding operation, the control means 46 judges that the operator is separated from the neighborhood of the apparatus and goes to Step a10. At Step a10, the control means 46 gives a signal indicating emergency stop to the tool rotation driving means 34 and the tool movement driving means 35, stops the tool holding jig 29 in an emergency, and goes to Step a11.

At Step a11, the control means 46 controls the error lamp 43 so as to light and goes to Step a12.

At Step a12, to move the tool holding jig 29 to the initial position, the control means 46 gives a drive signal to the tool rotation driving means 34 and the tool movement driving means 35, moves the welding tool 21 to the initial position, and goes to Step a13.

At Step a13, the control means 46 controls the error lamp 43 so as to go out. When the error lamp 43 goes out, the control means goes to Step a9.

At Step a9, the control means 46 ends the operation.

Figure 5:
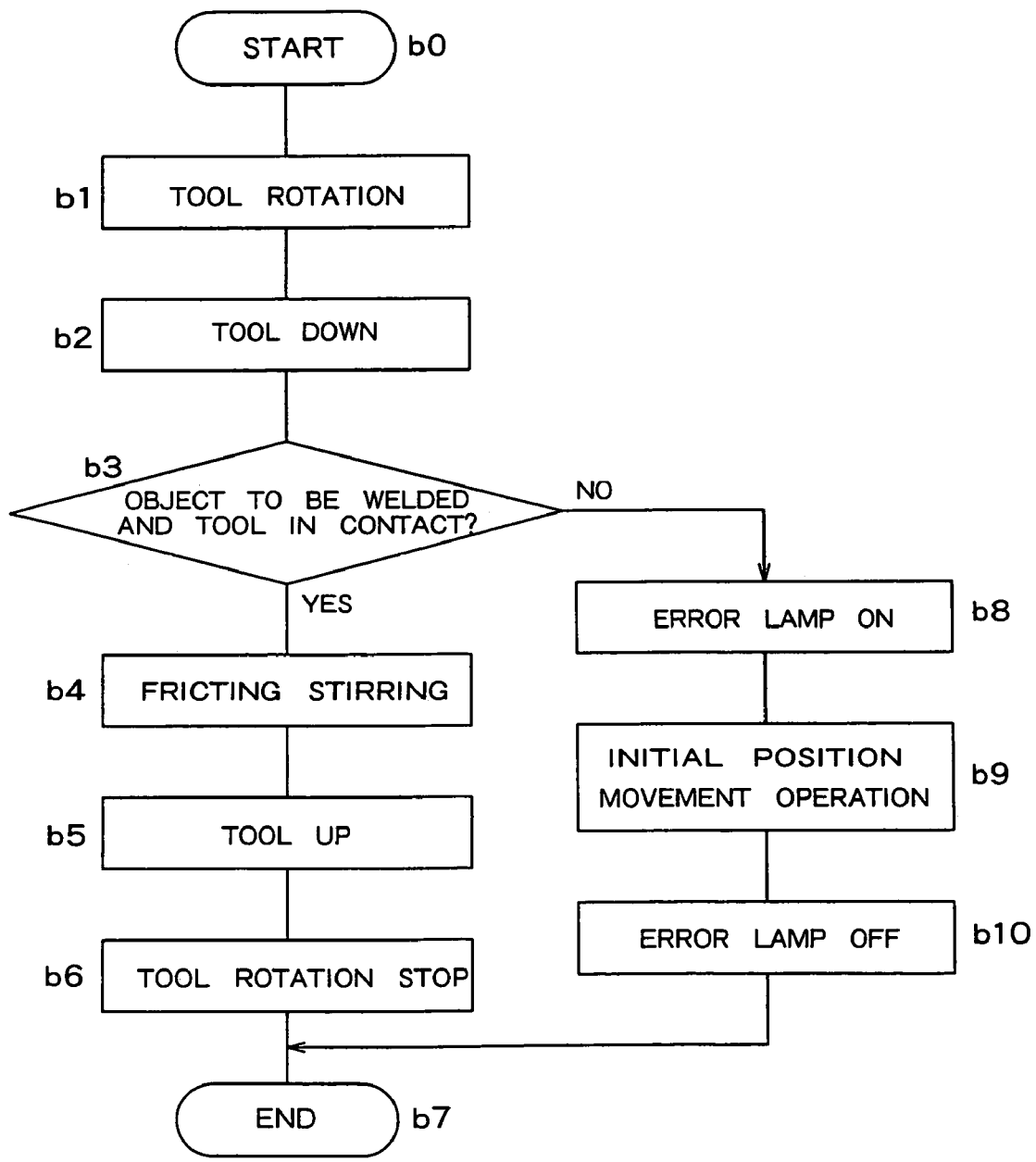
FIG. 5 is a flow chart showing the operation procedure of the control means of the welding operation of the friction stir welding apparatus shown in FIG. 1.

FIG. 5 is a flow chart showing the operation procedure of the control means of the welding operation. Further, FIGS. 6A and 6B and FIGS. 7A, 7B, and 7C are sectional views for explaining the procedure of the friction stir welding operation and the operation proceeds in the order of FIGS. 6A, 6B, 7A, 7B, and 7C.

The control means 46 instructs start of the welding operation at Step a3 aforementioned and at Step a5, it judges whether the welding operation is finished or not. The operation during this period, that is, the operation of the control means 46 in the welding operation will be explained by referring to FIGS. 6A and 6B and FIGS. 7A, 7B and 7C.

The control means 46, when it judges that the welding operation is started at Step b0, goes to Step b1 and starts the welding operation.

At Step b1, on the basis of the welding conditions, the control means 46 gives a signal to the tool rotation driving means 34 so as to rotate the tool holding jig 29. The control means 46 rotates the tool holding jig 29 and goes to Step b2.

At Step b2, on the basis of the welding conditions, the control means 46 gives a signal to the tool movement driving means 35 so as to bring the tool holding jig 29 close to the backing member 32. The control means 46, when the tool holding jig 29 is moved, as shown in FIG. 6A, moves the welding tool 21 toward the object to be welded 22 in the state that it is rotated and goes to Step b3.

At Step b3, as shown in FIG. 6B, at the time when the end of the welding tool 21 mounted on the tool holding jig 29 is presumed to make contact with the object 22, or when the end of the welding tool 21 is presumed to reach the position where the end of the welding tool 21 makes contact with the object 22, the control means 46 judges whether the object 22 and the end of the pin 51 of the welding tool 21 make contact with each other or not.

For example, the control means 46, on the basis of the welding conditions, calculates the time or displacement position where it is presumed that the welding tool will make contact with the object to be welded 22. Further, the control means 46, on the basis of a signal indicating the load torque of the driving means 34 and 35, judges that the object 22 and the welding tool 21 make contact with each other. Further, the control means 46 may judge the contact state on the basis of a signal given from a contact sensor for judging that the object 22 and the welding tool 21 make contact with each other. The control means 46 goes to Step b4 when it judges that the welding tool 21 makes contact with the object 22.

At Step b4, on the basis of the welding conditions, the control means 46 operates the tool rotation driving means 34 and the tool movement driving means 35. The control means 46, on the basis of the welding conditions, gives a signal to the tool driving means 34 and 35 and buries the welding tool 21 into the object 22.

As shown in FIG. 7A, the welding tool 21 rotates while making contact with the object 22, thereby generates friction heat. The welding tool 21 forms a fluid part 53 in the object 22 by making it fluid by frictional heat. The welding tool 21 forces its way through the fluid part 53, moves toward the backing member 32, and is buried into the object 22.

The control means 46, for example, on the basis of the welding conditions given in Table 1, gives a signal respectively to the driving means 34 and 35, and when the welding tool 21 is buried up to a predetermined position, pressurizes the welding tool 21 at a predetermined pressure in the state that the welding tool 21 is rotated, and stirs the fluid part 53 formed in the object 22 around the welding tool 21.

The control means 46, for example, on the basis of the welding conditions given in Table 2, gives a signal respectively to the driving means 34 and 35, and when the welding tool 21 is buried up to a predetermined position, stops the movement in the state that the welding tool 21 is rotated, and stirs the fluid part 53 formed in the object 22 around the welding tool 21.

Concretely, as shown in FIG. 7B, when the pin 51 reaches up to the neighborhoods of the respective boundary parts of the member 22b nearest to the backing member among the members 22a and 22b constituting the object to be welded 22, and of the member 22a on the opposite side to the backing member 32, the control means 46 gives a predetermined pressure to the welding tool 21 in the state that it is rotated and stirs the fluid part 53. Or, the control means 46 stops the movement of the welding tool 21 in the state that it is rotated and stirs the fluid part 53. The welding tool 21 mixes the respective areas where the members 22a and 22b are neighboring. The control means 46, when the fluid part 53 is sufficiently stirred, goes to Step b5.

At Step b5, the control means 46, on the basis of the welding conditions, gives a signal to the tool rotation driving means 34 and the tool movement driving means 35 and separates the welding tool 21 from the object 22. As shown in FIG. 7C, the welding tool 21 moves so as to separate from the object 22 by the tool movement driving means 35. The control means 46, when it judges that the welding tool 21 moves up to a predetermined position, goes to Step b6.

At Step b6, the control means 46 gives a signal to the tool rotation driving means 34, stops the rotation of the welding tool 21, and goes to Step b7.

At Step b7, the control means 46 finishes the operation relating to the welding operation.

At Step b3, the control means 46, when it judges that the welding tool 21 is not in contact with the object 22, goes to Step b8. At Step b8, the control means 46 controls the error lamp 43 so as to light and goes to Step b9. At Step b9, the control means 46 gives a signal to the tool rotation driving means 34 and the tool movement driving means 35 and moves the tool holding jig 29 and the welding tool 21 respectively to preset initial positions. When the tool holding jig 29 is moved to the initial position, the control means 46 goes to Step b10.

At Step b10, the control means 46 controls the error lamp 43 so as to go out. When the error lamp 43 goes out, the control means 46 goes to Step b7. At Step b7, the control means 46 finishes the operation relating to the welding operation.

The control means 46, during execution of the operation relating to the welding operation, monitors an interruption of a signal given from the operation pedal 39 and when a welding stop instruction signal is given from the operation pedal 39 during the welding operation, goes to Step a10 mentioned above. Further, the aforementioned operation of the tool holding jig 29 by the control means 46 is decided by the welding conditions and when the welding conditions are changed, the operation of the control means 46 is also changed.

Figure 8:
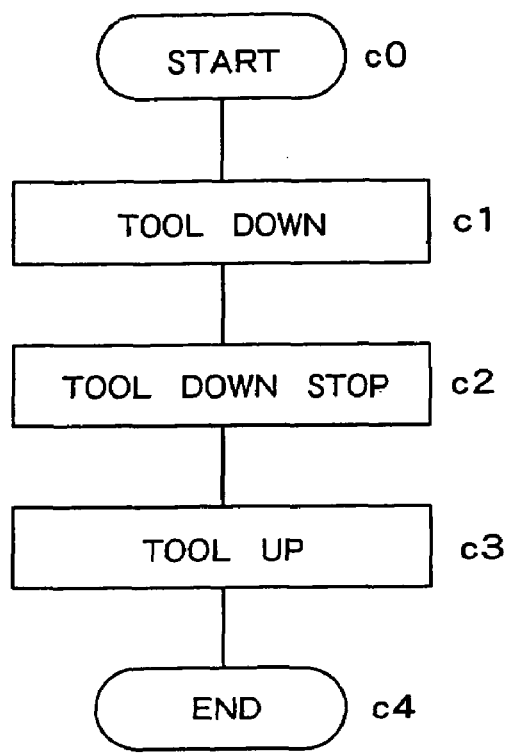
FIG. 8 is a flow chart showing the operation procedure of the control means of the welding position confirmation operation of the friction stir welding apparatus shown in FIG. 1.

FIG. 8 is a flow chart showing the operation procedure of the control means 46 of the welding position confirmation operation. The friction stir welding apparatus, when the welding position confirmation operation is performed, can make an operator confirm the welding position where the object 22 is to be welded. The control means 46, when a signal indicating execution of the welding position confirmation operation by the operator is given from the input unit 36, goes to Step c1 and starts the operation of the control means 46 of the welding position confirmation operation.

At Step c1, the control means 46 gives a signal to the tool movement driving means 35 so as to bring the tool holding jig 29 close to the object 22 on the basis of the welding conditions. The control means 46, on the basis of the plate thickness of the object 22 and the length of the pin 51 and the tool 52, sets the movement distance of the welding tool 21. When the movement of the welding tool 21 is completed, the control means 46 goes to Step c2.

At Step c2, the control means 46 stops the welding tool 21 at the position where it is close to the object. 22. By doing this, the operator can confirm the position where the welding tool 21 will make contact with the object 22. When a signal indicating that the operator confirms the welding position is given to the input unit, the control means 46 goes to Step c3.

At Step c3, the control means 46 gives a signal to the tool movement driving means 36 so as to separate the tool holding jig 29 from the object 22 and moves the tool holding jig 29 to the predetermined initial position. When the tool holding jig 29 is returned to the initial position, the control means 46 goes to Step c4 and finishes the operation. The aforementioned operation of the control means 46 is performed without the tool holding jig 29 being rotated. However, the tool holding jig 29 may be rotated.

As mentioned above, in the friction stir welding apparatus 20 of this embodiment, the base 23 is fixed to the floor 30 and the friction stir welding apparatus 20 performs the welding operation for the object 22 in the state that it is positioned with respect to the reference axis L1. Therefore, there is no need to move the base 23 for the object 22 and there is no need to install an arm for moving the base 23. By doing this, the constitution of the friction stir welding apparatus 20 can be simplified and miniaturized and an inexpensive friction stir welding apparatus 20 can be provided. Further, the base 23 does not move, so that the installation space can be made smaller.

As mentioned above, the friction stir welding apparatus 20 of this embodiment can be manufactured under the condition of a small installation space and a low cost, so that the initial fund necessary for introduction of the friction stir welding apparatus 20 can be reduced. Therefore, even a user who is short of funds and has only a small installation space such as a small and medium-sized enterprise can introduce the friction stir welding apparatus 20. When the friction stir welding apparatus 20 is introduced and the object 22 is welded by the friction stir welding, even if a heat treatment alloy having no molten part is used, a welded object having large welding strength and having little strain and residual stress can be formed. Further, there is no need to use a melting material and to remove excess metal, thus welding can be executed easily. Further, a welded object having a part to be welded 47 whose quality is stable can be manufactured. Furthermore, even a material, a casting, a composite material, or a different kind of material which is easily cracked due to welding can be welded.

Further, the operator positions the object 22 and performs the welding operation, so that even if the shape of the object 22 is changed, there is no need to teach the movement position of the welding apparatus unlike the conventional art. Therefore, the adjustment operation to be performed for every object to be welded can be reduced and the time required for adjustment of the friction stir welding apparatus 20 can be shortened. Particularly when the object 22 is of low-volume and high-variety production, the adjustment time required for every object to be welded can be reduced, thus the productive efficiency can be improved.

Further, when the object 22 is supported and held by the backing member 32, at the time of making contact with the welding tool 21, the part to be welded 47 of the object 22 can be clamped by the backing member 32 and the welding tool 21, and the part to be welded 47 of the object 22 can be prevented from deformation. Further, since the reference axis L1 is arranged vertically, the operator for positioning the object 22 may load the object 22 on the backing member 32 and during welding, thereby, the weight of the object 22 is not applied to the hands of the operator.

Further, since the welding conditions can be input to the controller 38, the welding operation can be performed under different conditions for every object 22 and the welding quality can be improved. The controller is installed in the neighborhood of the base 23 and when an operator performs the welding operation, it is installed within his reach when he stretches his arm and at a position where there is no danger even if he operates the input unit 36 during his welding operation. Therefore, during the welding, he can safely input the welding conditions to the input unit 36.

Further, when the operation pedal 39 is stepped on by an operator, the control means 46 controls so as to perform the welding operation, so that when he leaves the base 23, the welding operation does not proceed and a failure in the operatorless state can be prevented.

Further, since the control means 46 judges whether the welding tool 21 and the object 22 make contact with each other or not, it can notify an err of positioning of the object 22. An err of positioning, for example, when the object 22 is not held by the base 23, is a case that the welding position is a position different from a preset position.

Further, the control means 46 can perform the welding position confirmation operation for confirming the welding position to weld the object 22 by an operator, so that the operator can fit the welding position accurately to the reference axis L1, thus the welding position can be prevented from shifting.

Further, the operator can instruct start and end of the welding operation by the operation pedal 39, so that he can perform the welding operation in the state that the object 22 is held by both hands during the welding operation. By doing this, the object 22 can be prevented from insufficient holding and from defective welding.

Further, since the operator is notified of the operation state by the end lamp 42, the error lamp 43, and the speaker 44, the operator can accurately know the operation state and the operator can be prevented from his malfunctions.

Figure 9:
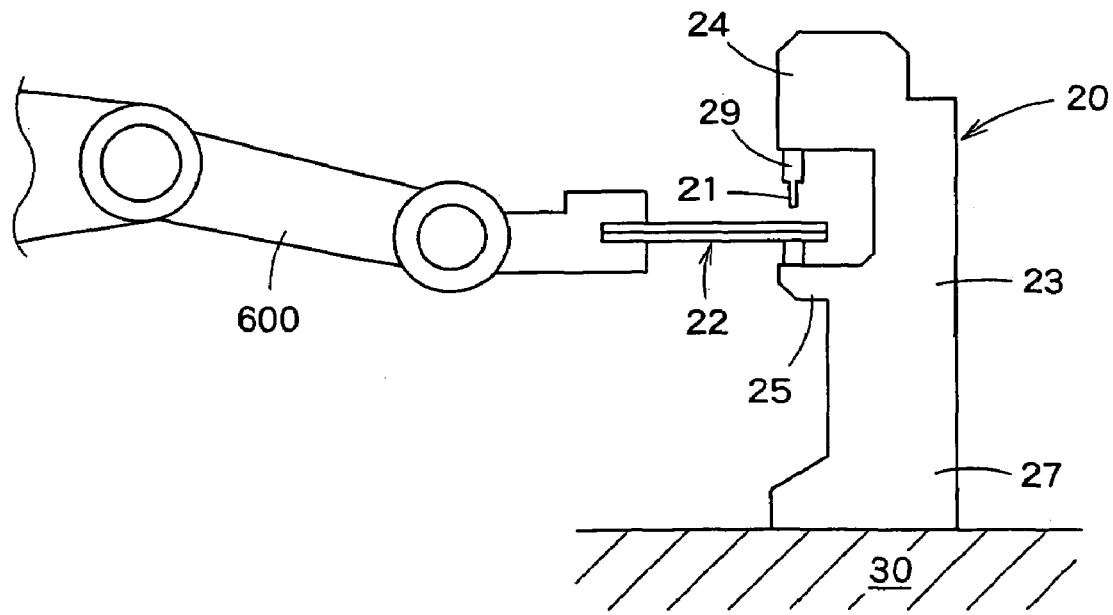
FIG. 9 is a drawing showing another operation configuration of the friction stir welding apparatus shown in FIG. 1.

FIG. 9 is a drawing showing another operation configuration of the friction stir welding apparatus 20. For the friction stir welding apparatus 20, the object to be welded 22 may not be positioned by an operator and for example, the object 22 may be positioned for the base 23 by a robot 600 holding the object 22. For example, when the object 22 held by the robot 600 is to be sequentially processed by a plurality of processing devices, the object 22 can be welded in the state that it is held by the robot 600.

Figure 10:
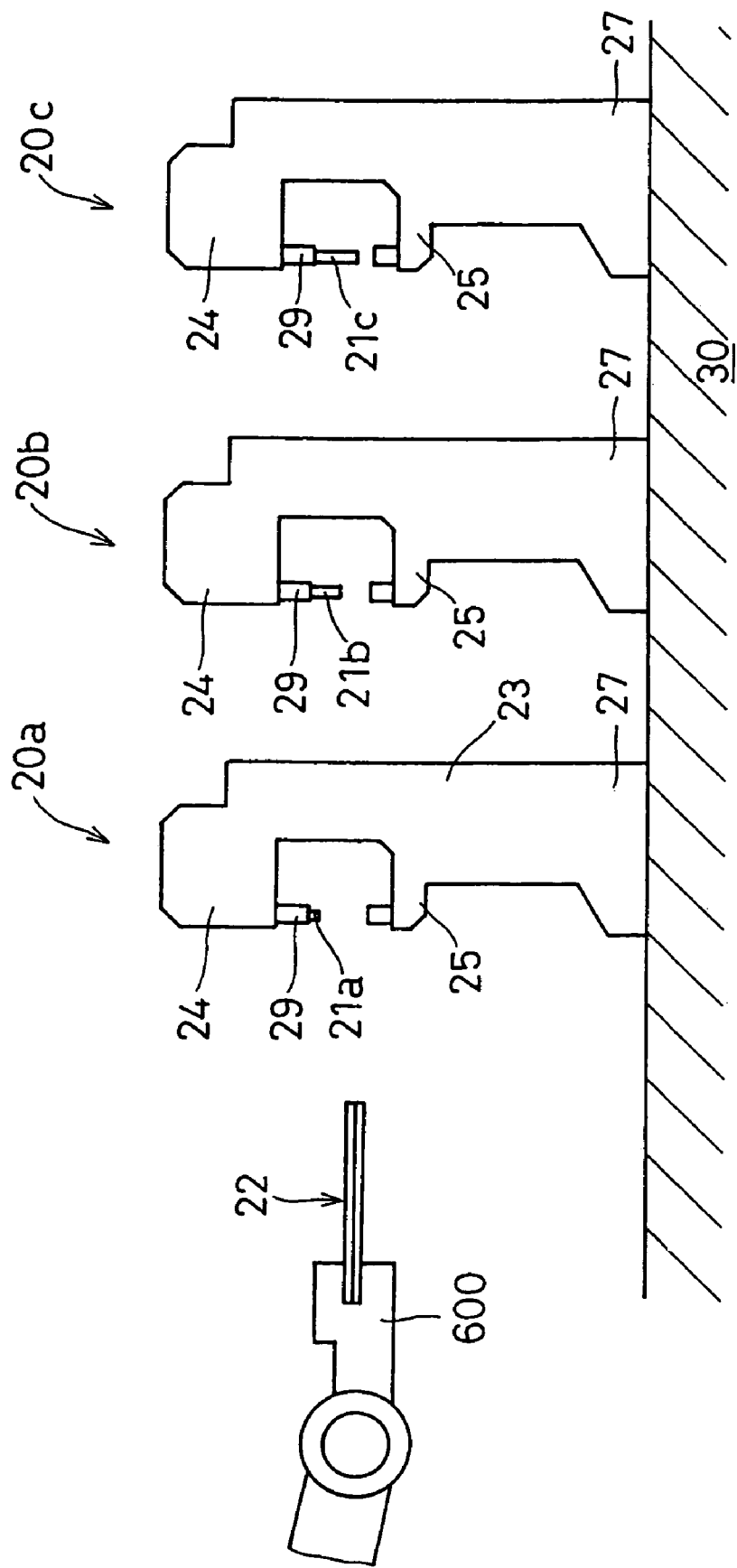
FIG. 10 is a drawing showing still another operation configuration of the friction stir welding apparatus shown in FIG. 1.

FIG. 10 is a drawing showing still another operation configuration of the friction stir welding apparatus 20a, 20b, and 20c. As shown in FIG. 10, a plurality of friction stir welding apparatuses 20a, 20b, and 20c mentioned above may be installed. On each of the friction stir welding apparatuses 20a, 20b, 20c, welding tools 21a, 21b, and 21c in different shapes are mounted. The friction stir welding apparatuses 20a, 20b, and 20c performing the welding operation for every object 22 are selected and by the friction stir welding apparatus having a mounted welding tool according to the object 22, the welding operation is performed. By doing this, the labor for exchanging the welding tool 21 according to the object 22 is saved, thus the productive efficiency can be improved.

Figure 11:
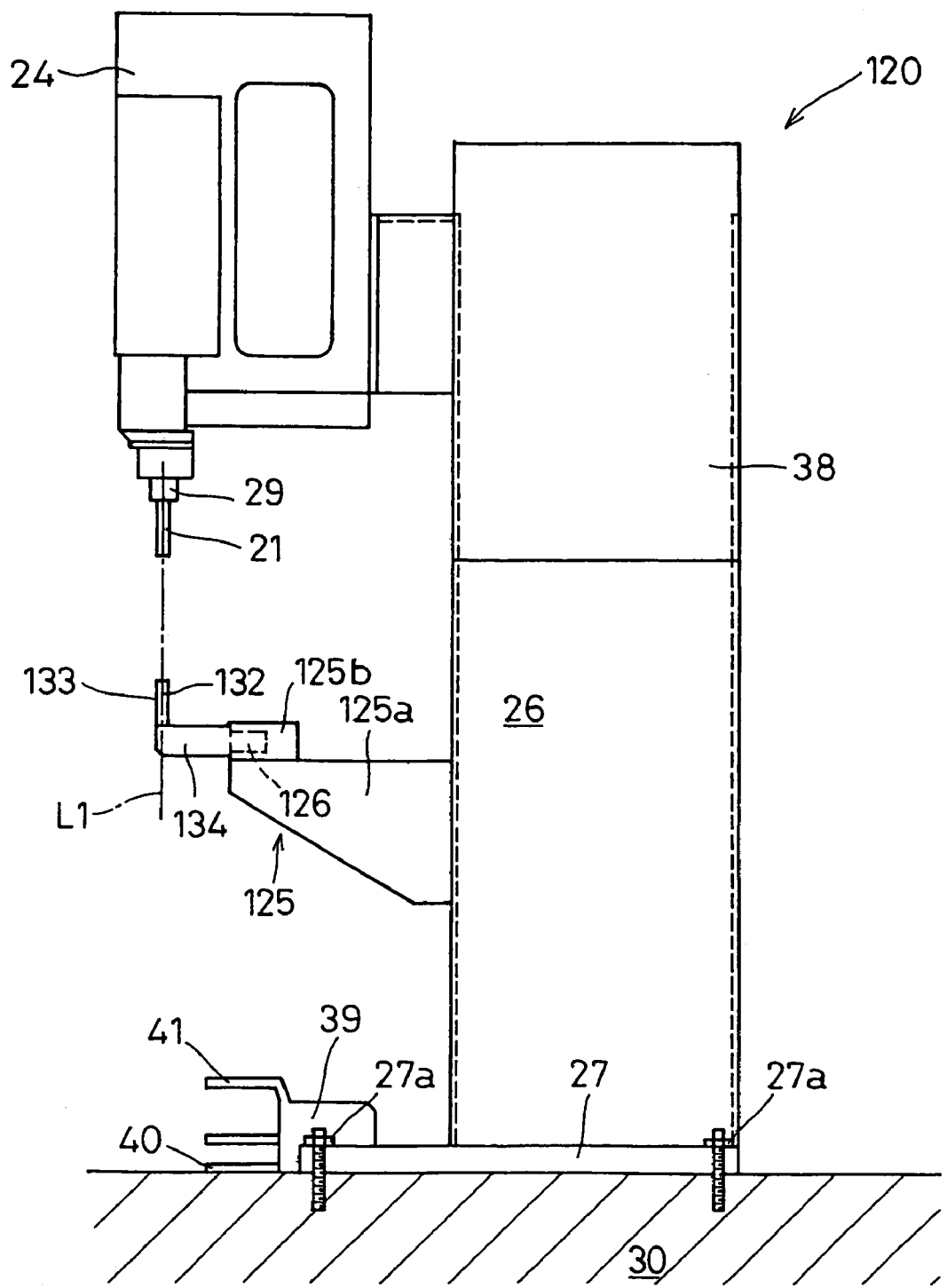
FIG. 11 is a side view showing the friction stir welding apparatus of another embodiment of the present invention.
Figure 12:
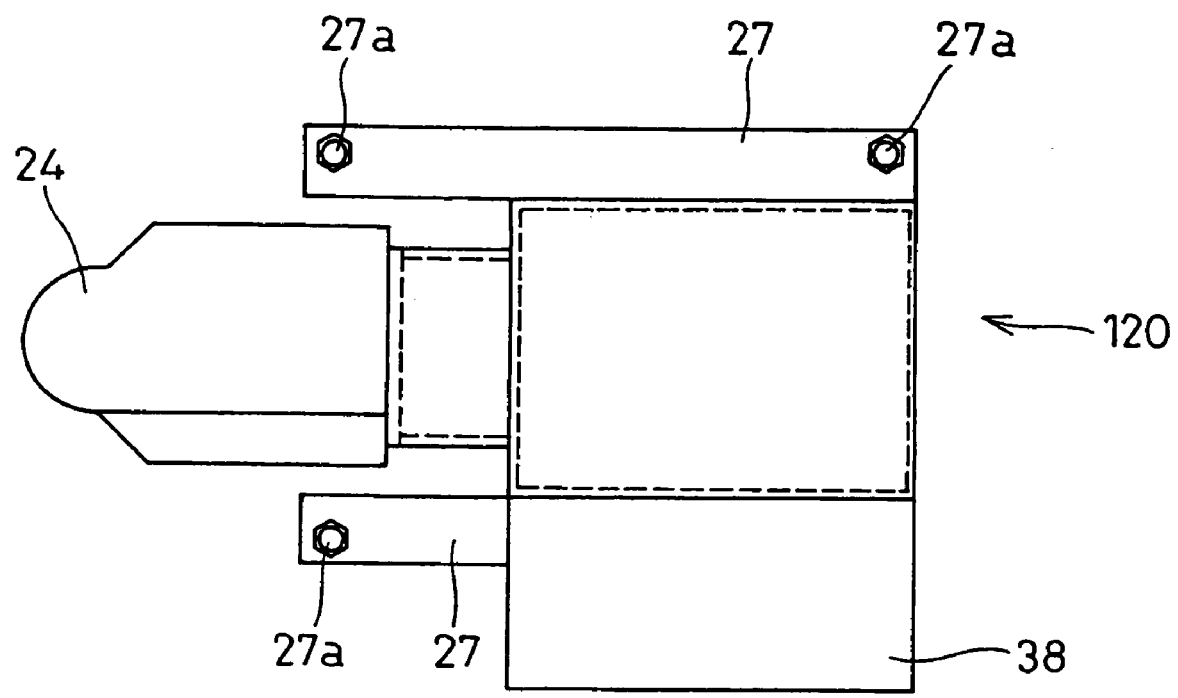
FIG. 12 is a plan view showing the friction stir welding apparatus shown in FIG. 11.

FIG. 11 is a side view showing a friction stir welding apparatus 120 of another embodiment of the present invention and FIG. 12 is a plan view showing the friction stir welding apparatus 120. The friction stir welding apparatus 120 shown in FIGS. 11 and 12 has the same constitution as that of the friction stir welding apparatus 20 shown in FIG. 1 except the table, and the same reference numerals are assigned and the explanation is omitted for the same portions.

The friction stir welding apparatus 120 includes a table 125 opposite to the head 24 at an interval. The table 125 has a table body 125a, a backing member support part 125b, and a backing member 132. The table body 125a is connected to the column 26 and is projected toward the reference axis L1 of the tool holding jig 29. On the face of the table body 125a opposite to the tool holding jig 29, the backing member support part 125b is installed. In the backing member support part 125b, a through hole 126 extending perpendicularly to the reference axis L1 and in the radial direction of the reference axis L1 is formed.

The backing member 132 has a first part 133 which is formed in a cylindrical shape and extends linearly and a second part 134 which is connected to one end of the first part 133 so as to be bent from the first part 133 so that the backing member 132 forms a substantially L-shape. The second part 134 is fit into the through hole 126 of the backing member support part 125b. By doing this, the backing member 132 is supported by the backing member support part 125b. Further, in the first part 133, the center axis extending in the longitudinal direction thereof is arranged coaxially with the reference axis L1 and is projected from the second part 134 toward the tool holding jig 29. Therefore, the second part 134 of the backing member 132 is projected from the table body 125a toward the reference axis L1 and the first part 133 is projected from the second part 134 toward the tool holding jig 29.

Further, the base part 27 is connected removably to the floor by an anchor bolt 27a.

During the friction stir welding, the welding operation is performed in the state that the object 22 clamped and held by an operator or a robot is supported by the first part 133 of the backing member 134.

Also in the friction stir welding apparatus 120 of this embodiment, the same effects as those of the friction stir welding apparatus 20 shown in FIG. 1 can be obtained. Furthermore, since the backing member 133 is formed almost in an L-shape and is projected from the table body 125a, to position the object 22, the object 22 and the table body 125a can be prevented from making contact with each other, and the table body 125a can be prevented from obstructing the welding operation, thus a good welding operation can be performed.

FIG. 13 is a perspective view showing a friction stir welding device 220 of still another embodiment of the present invention and FIG. 14 is a perspective view showing a holding jig 228 mounted on the friction stir welding device 220.

The friction stir welding device 220 has the same constitution as that of the friction stir welding apparatus 20 shown in FIG. 1 except the table, and the same reference numerals are assigned and the explanation is omitted for the same portions.

In the friction stir welding device 220, the welding operation is performed in the state that the holding jig 228 for holding the object 22 is positioned on the table 225.

On the base 23 of the friction stir welding device 220, a table 226 opposite to the head 24 is installed at an interval. The table 225 has an opposing face 231 which is perpendicular to the reference axis L1 and faces the tool holding jig 29. Further, on the table 225, a positioning means for positioning the holding jig 228 is installed. According to this embodiment, the positioning means is composed of a plurality of positioning convexities 233 projecting from the opposing face 231 toward the tool holding jig 29.

As shown in FIG. 14, the holding jig 228 holds the object 22. The holding jig 228 is loaded on the opposing face 231 of the table 225. In the holding jig 228, positioning concavities 280 to be fit into the positioning convexities 233 of the base 23 are formed. The holding jig 228 is positioned so that the positioning concavities 280 are fit into the positioning convexities 233 of the base 23.

The holding jig 228 is loaded on the opposing face 231 and includes a support body 250 formed in a plate shape, a fixed piece 251 projected from the face of the support body 250 on one side A1 in the thickness direction, and a holding part 252 having a pressing part 262 to which force toward the other side A2 in the thickness direction of the support body 250 is applied.

The face of the support body 260 on one side A1 in the thickness direction is a contact face 253 with which the object 22 is to make contact. Further, the face of the support body 250 on the other side A2 in the thickness direction is an apparatus contact face 290 which makes contact with the opposing face 231 of the table 225. The positioning concavities 280 fitting into the plurality of positioning convexities 233 formed in the table 255 are formed in the support body 250. In the state that the object 22 is arranged in the support body 250, the positioning concavities 280 are positioned so as to be fit into the positioning convexities 233, thus the positioning concavities 280 are formed so that the object 22 is positioned for the base 23.

A plurality of fixed pieces 251 are installed. The fixed pieces 251, when the object 22 is arranged in the position to be held on the support body 250, make contact with faces 260a and 260b of the object 22 on the side of the movement prevention direction B1 which is at least one of the directions perpendicular to the thickness directions A1 and A2 of the support body 250. The fixing pieces 251 make contact with the object 22 to prevent the object 22 from moving in the movement prevention direction B1.

In this embodiment, each of the fixed pieces 251 is bent and extended in an almost L-shape and is composed of a first part 254 extending in one direction A1 of the thickness direction of the support 255 from the contact face 253 and a second part 255 which is connected to the end of the first part 254 and extends in the direction D2 opposite to the movement prevention direction B1.

For example, when the members 22a and 22b constituting the object 22 are different in size and the faces 260a and 260b of the object 22 in the movement prevention direction B1 are formed in a multi-stage, with the face 260b most projecting in the movement prevention direction B1 among the multi-stage faces 260a and 260b, the first part 254 of the fixed piece 251 makes contact, and with the cave-in face 260a in the opposite direction B2 of the movement prevention direction B1 from the face 260b, an end face 261, which is an end face of the second part 255 and is opposite to the part extended to the first part 254, makes contact.

Further, the holding part 252, for example, is realized by a toggle clamp. The toggle clamp includes a link mechanism composed of three link bars 270, 271, and 272. The three link bars 270, 271, and 272 are arranged so as to change the angle almost on the same plane. The first link bar 270 and second link bar 271 are arranged so as to change the angle at one ends 270a and 271a and arranged so as to mutually cross. In the third link bar 272, both ends 272a and 272b are connected to medium parts 270b and 271b of the first and second link bars 270 and 271 in the longitudinal direction so as to change the angle. When the second link bar 271 changes the angle about the one end 271a, the first link bar 270 intersecting it orthogonally changes the angle in the same direction as the angle changing direction of the second link bar 271.

The first link bar 270 is arranged almost perpendicularly to the thickness directions A1 and A2 and is formed with the pressing part 262 at its free end. The pressing part 262 is arranged facing to the portion surrounding the part to be welded 47 where the object 22 is to be welded. The pressing part 262 is formed, for example, in a C shape and faces on the peripheral part of the object 22 in the peripheral direction around the part to be welded 47. Further, the first link bar 270 has a connected spring 273 and spring force for moving the pressing part 262 in the other thickness direction A2 is given by the spring 273. Further, the second link bar 271 is arranged almost perpendicularly to the thickness directions A1 and A2 and a holding part 281 for an operator to hold the second link bar 271 is installed at the free end part.

The holding part 281 is arranged at the position in the neighborhood of the pressing part 262 by the spring 273 in the natural state. The operator holds the holding part 281 and changes the angle of the second link bar 271 in the direction to separate the pressing part 262 from the support body 250, thus the pressing part 262 is separated from the support body 250 and a gap for making the object 22 contact with the support body 250 is formed.

The object 22 is made contact with the contact face 253 of the support body 250 by the operator. The object 22, in the state in contact with the contact face 253 of the support body 250, is moved in the movement prevention direction B1 toward the fixed piece 251 and the object 22 makes contact with the fixed piece 251 so as to be positioned.

In this state, the operator moves the holding part 281 in the direction to bring it close to the support body 250. The pressing part 262 approaches the support body 250 by the elastic recovery force of the spring 273. The pressing part 262 presses the object 22 in the other thickness direction A2 and the object 22 is clamped and held by the pressing part 262 and the support body 250.

In the state that the object 22 is held, the holding jig 228 is positioned so as to fit the positioning concavities 280 of the holding jig 282 into the positioning convexities 233 of the base 23. By doing this, the object 22, which is held by the holding jig 228, can be positioned to the base 23.

Also in the friction stir welding device 220 in this embodiment, the same effects as those of the friction stir welding apparatus 20 shown in FIG. 1 can be obtained. Furthermore, since the positioning concavities 280 of the holding jig 282 are fit into the plurality of positioning convexities 233, when the operator moves and positions the object 22 to the base 23, the object 22 can be prevented from shifting. By doing this, the time required to adjust the position of the object 22 to the base 23 can be shortened and the number of objects 22 to be welded per unit time can be increased.

Further, the holding jig 228 for holding the object 22 is positioned to the base 23, thus the welding operation can be performed in the state that the object 22 to be positioned to the reference axis L1 is held, The welding operation is performed in the state that the object 22 is held, thus the object 22 can be prevented from shifting, movement, and deformation during welding. By doing this, the welding quality of the object 22 can be improved.

Further, when the welding tool 21 is to rotate and make contact with the object 22, there is the possibility that force to move the object 22 may be applied and the object 22 may be raised to high temperature by frictional heat. The welding operation is performed in the state that the holding jig 228 holds the object 22, thus the operator himself does not need to hold the object 22 and the convenience is enhanced.

Further, in the holding jig 228, the fixed pieces 251 are formed in an almost L shape, so that even when the plurality of members 22a and 22b constituting the object 22 are different in size, they be can be held surely. Further, in the state that the holding jig 288 is mounted in the friction stir welding device 220, it is possible to position the object 22 to the holding jig 228 and hold the object 22 by the holding jig 288. Further, the object 22 held by the holding jig 228 is positioned so that the part to be welded 47 is arranged on the reference axis L1, thus the positioning operation of the object 22 can be performed easily.

Further, the circumference of the part to be welded 47 of the object 22 is clamped by the clamping part 252, thus a gap can be prevented from being formed between the plurality of members 22a and 22b constituting the object 22 and the part to be welded 47 of the object 22 can be made contact with the support body 250. Further, the constitution of the holding jig 228 is not limited to the constitution shown in FIG. 14 and any other constitution capable of holding the object 22 is acceptable.

Figure 15:
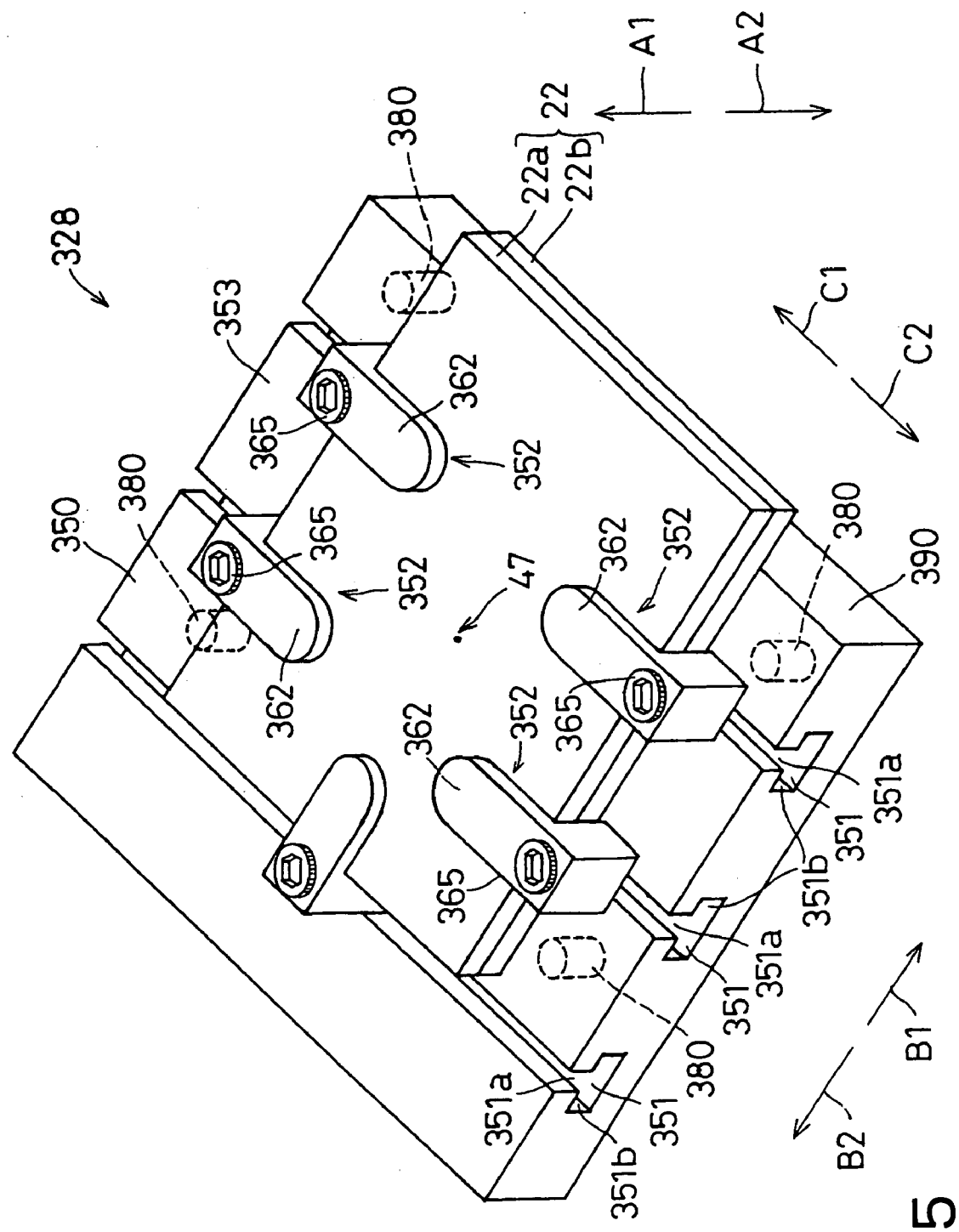
FIG. 15 is a perspective view showing another example of the holding jig mounted on the friction stir welding apparatus shown in FIG. 13.

FIG. 15 is a perspective view showing a holding jig 328 of another example and FIG. 16 is a perspective view showing a clamping part 352 of the holding jig 328.

The holding jig 328 is mounted on the opposing face 231 of the table 225. In the holding jig 328, positioning concavities 380 to be fit into the positioning convexities 233 of the base 23 are formed. The positioning concavities 380 of the holding jig 328 are fit into the positioning convexities 233 of the base 23, thus the holding jig 328 is positioned.

The holding jig 328 is mounted on the opposing face 231 and includes a support body 350 formed in a plate shape and clamping parts 352 having pressing parts 362 for pressing the object 22 in the other thickness direction A2 of the support body 250.

The face of the support body 350 on one side A1 in the thickness direction is a contact face 353 with which the object 22 makes contact. Further, the face of the support body 350 on the other side A2 in the thickness direction is an apparatus contact face 390 which makes contact with the opposing face 231 of the table 225. The positioning concavities 380 to be fit into the plurality of positioning convexities 233 formed in the table 255 are formed in the support body 350. In the state that the object 22 is arranged on the support body 360, the positioning concavities 380 are formed so that the object 22 is positioned to the base 23.

In the support body 350, a plurality of rail grooves 351 extending along the rail directions C1 and C2 perpendicular to the thickness directions A1 and A2 are formed. The rail grooves 351 are open in one thickness direction A1 and when the support body 350 is cut on the plane perpendicular to the rail directions C1 and C2, an area becoming smaller as extending in one thickness direction A1 is formed.

For example, when cut on the plane perpendicular to the rail directions C1 and C2, the rail grooves 351 are formed in an almost inverse T-shape. Concretely, in the rail grooves 351, on the opening side, narrow areas 351a are formed and on the other side A2 in the thickness direction from the narrow areas 351a, wider areas 351b wider than the narrow areas 351a are formed.

As shown in FIG. 16, each clamping part 352 includes the pressing part 362 for pressing the object 22, a screw rod 364 inserted into the pressing part 362, and a screwed part 363 spirally attached to the screw rod 364. The pressing part 362 has an insertion part 362a having a screw rod insertion hole into which the screw rod 364 is inserted, and a clamping part 362b projected perpendicularly to the axis of the insertion hole from the insertion part 362a. The screw rod 364 has a head 365 larger than the screw rod insertion hole formed at an end 364a thereof. Further, the screwed part 363 is screwed to another end 364b of the screw rod 364 and moves up and down. The screwed part 363 is fit into the wide area 351 a of the rail groove 351. Further, the screw rod 364 is inserted into the pressing part 362, inserted into the narrow area 351b of the rail groove 351a, and is screwed to the screwed part 363.

When the screw rod 364 rotates, the screwed part 363 approaches or separates from the head 363 of the screw rod 364. The screwed part 363 is fit into the rail groove 351, so that it will not come out from the rail groove 351, and the screw rod 364 rotates, thus the pressing part 362 approaches or separates from the support body 350.

Figure 18:
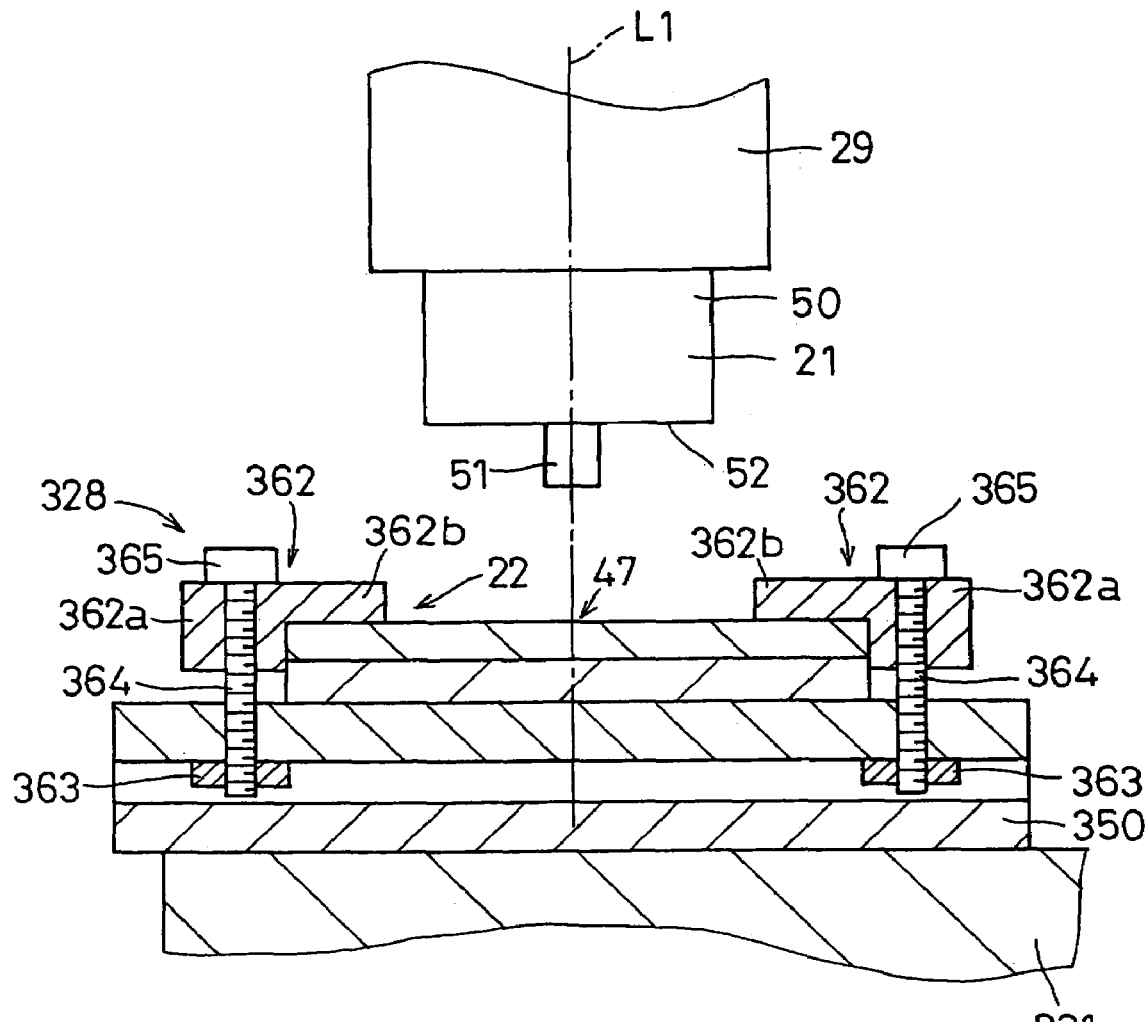
FIG. 18 is a sectional view viewed from the section line S-S shown in FIG. 17.

FIG. 17 is a perspective view showing the friction stir welding device 220 in the state that the holding jig 328 is mounted and FIG. 18 is a sectional view viewed from the section line S-S shown in FIG. 17. In the state that the object 22 is mounted on the support body 350, the plurality of clamping parts 352 are arranged on the peripheral part of the object 22. In each clamping part 352, the clamping part 362a of the pressing part 362 is fixed to the surface on one side A1 in the thickness direction of the object 22.

When the screw rod 364 rotates in this state, the pressing part 362 moves toward the support body 350 and presses the object 22 to the support body 350. The object 22 is clamped, thus the object 22 is prevented from moving perpendicularly to the thickness directions A1 and A2, thereby can be held. Further, the shape of the pressing part 362 can be changed according to the shape of the object 22, thus the object 22 can be suitably clamped. The object 22 is held by the holding jig 328 in the positioned state. By doing this, the part to be welded 47 of the object 22 is arranged on the reference axis L1.

The holding jig 328 is prepared for every object 22 and it stands by in the state that it holds the object 22. An operator arranges the holding jig 328 holding the object 22 on the friction stir welding apparatus 320 and starts the welding operation. When the welding operation is completed, he removes the object 22 together with the holding jig 328. By doing this, there is no need to directly position the object 22 on the base and the welding operation can be shortened. Further, the clamping part 352 slides along the rail groove 351, thus even an object 22 different in size can be held by one holding jig 328.

The friction stir welding device 220, when the holding jig 328 is positioned, can obtain the same effects as those when the holding jig 228 shown in FIG. 14 is positioned, and the operator does not need to hold the object 22, and the convenience can be enhanced. As mentioned above, a holding jig 228 according to the kind of the object 22 may be prepared and a holding jig 328 for holding each object to be welded 22 may be installed. Further, when the object 22 is retained in the state that it is held by the holding jig 328, the positioning operation in the welding operation can be shortened and the time required for the welding operation can be shortened.

Figure 19:
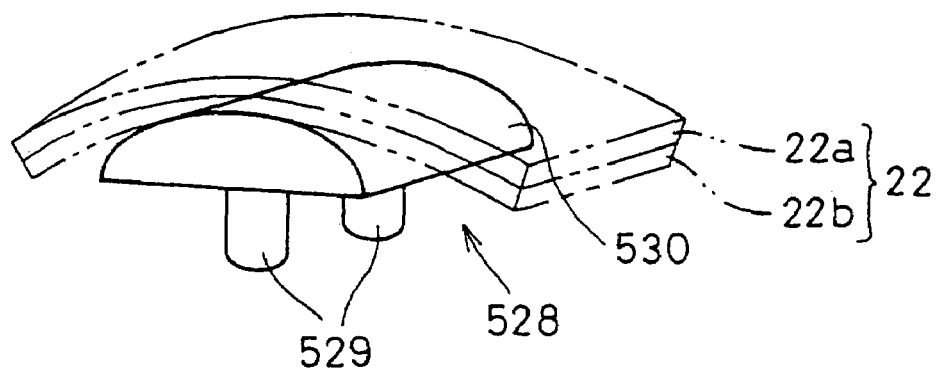
FIG. 19 is a perspective view showing still another example of the holding jig mounted on the friction stir welding apparatus shown in FIG. 13.

FIG. 19 is a perspective view showing still another holding jig 528. The holding jig 528 is temporarily fixed to the object 22 at one or more positions. The holding jig 528 is fixed at the position facing on the welding position of the object 22 in contact with the object 22 from the opposite side of the tool holding jig 29. On the holding jig 528, a fitting part 529 fitting into the positioning means of the base 23 is formed. For example, when the positioning means of the base 23 is pin holes formed in the table, the fitting part 529 has projections formed so as to be fit into the pin holes.

The fitting part 529 of the holding jig 528 and the pin holes of the table are formed so that the object 22 can be positioned to the base 23 by fitting the fitting part 529 into the pin holes in the state that the holding jig 528 is temporarily fixed to the object 22.

Using the friction stir welding device 220, the welding operation is performed in the state that the holding jig 528 temporarily fixed to the object 22 is positioned on the table. The holding jig 528, at the position facing on the welding part, is fixed in contact with the object 22 from the opposite side of the tool holding jig 29. By doing this, when the welding operation is performed, the object 22 can be supported by the holding jig 528 from the opposite side of the welding tool 21, and the object 22 is prevented from deformation, thus the welding operation can be performed satisfactorily. Namely, the object to be welded 22 is positioned by the holding jig 528 and the same effects as those when the backing member 32 shown in Table 1 is used can be obtained.

Further, the shape of the fitting part 529 may be any other shapes which are positioned by the positioning means of the table.

Further, when a face 530 of the holding jig 528 which makes contact with the object 22 is formed along the shape of the object 22, even if the object 22 has a curved surface or a three-dimensional surface, it can be supported satisfactorily.

Further, also with respect to the other holding jigs 228 and 328 mentioned above, when the object 22 is supported at the position facing on the welding position in contact with the object 22 from the opposite side of the tool holding jig 29, the same effects as those when the backing member 32 is used can be obtained.

Figure 21:
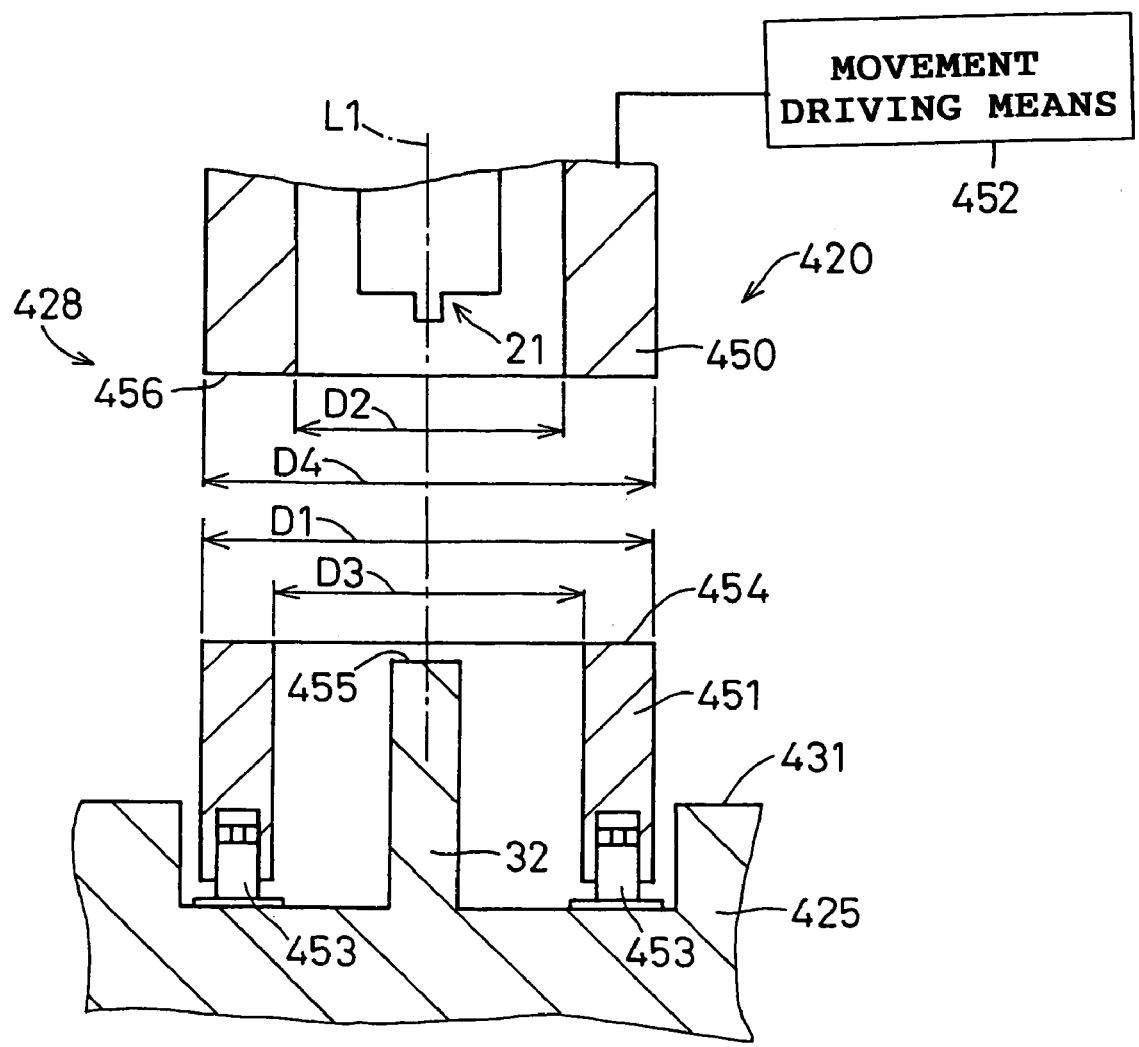
FIG. 21 is a sectional view showing the enlarged neighborhood of the table of the friction stir welding apparatus shown in FIG. 20.

FIG. 20 is a perspective view showing the friction stir welding apparatus 420 of a further embodiment of the present invention and FIG. 21 is a sectional view showing the enlarged neighborhood of the table of a friction stir welding apparatus 420. The constitution of the friction stir welding apparatus 420 is the same as that of the friction stir welding apparatus 20 shown in FIG. 1 except the head and table, and the same numerals are assigned and the explanation will be omitted for the same portions.

The base 23 of the friction stir welding apparatus 420 includes a head 424 where the tool holding jig 29 for removably mounting the welding tool 21 is installed and a table 425 facing the head 424 at an interval. The table 425 has an opposing face 431 which is perpendicular to the reference axis L1 and facing the tool holding jig 29. On the table 425, the columnar backing member 32 projecting from the opposing face 431 toward the tool holding jig 29 is installed. Furthermore, on the head 424 and the table 425, a holding means 428 for holding the object 22 is installed.

The holding means 428 includes a first clamping piece 450 and a second clamping piece 451 which cooperatively clamp the object 22, a clamping piece movement driving means 452 for moving the first clamping piece 450, and a spring force generation means 453 for elastically supporting the second clamping piece 461.

The first clamping piece 450 is installed on the head 424 movably along the reference axis L1 and is arranged in the peripheral direction of the tool holding jig 29. The clamping piece movement driving means 452 moves the first clamping piece 450 so as to displace relatively with respect to the tool holding jig 29 and the base 23 along the reference axis L1. The clamping piece movement driving means 452 operates according to a signal given from the control means 46.

The second clamping piece 451 is installed on the table 425 movably along the reference axis L1 and is arranged in the peripheral direction of the backing member 32. The second clamping piece 451 is projected toward the tool holding jig 29 over an end face 455 of the backing member 32 at the initial position in the no-load state when the object 22 is not arranged and is elastically supported by the spring force generation means 453. The spring force generation means 453 gives spring force for moving the second clamping piece 29 toward the tool holding jig 29 along the reference axis L1, and for example, it is realized by an air damper or a compression coil spring. Further, the first clamping piece 450 and the second clamping piece 451 are arranged in opposite positions and it is preferable to form them at a plurality of locations around the reference axis L1 or to form them over a wide range.

According to this embodiment, the first clamping piece 450 is formed in a cylindrical shape so as to cover the tool holding jig 29 in the peripheral direction thereof. The first clamping piece 450 is arranged coaxially with the tool holding jig 29. The second clamping piece 451 is formed in a cylindrical shape so as to cover the backing member 32 in the peripheral direction thereof. The second clamping piece 451 is arranged coaxially with the tool holding jig 29. When the first and second clamping pieces 450 and 451 are cylindrical, the outer diameter D1 of the second clamping piece 451 is larger than the inner diameter D2 of the first clamping piece 450 and the inner diameter D3 of the second clamping piece 451 is smaller than the outer diameter D4 of the first clamping piece 450.

Further, the shape of the first and second clamping pieces 450 and 451 is not limited to cylindrical and it may be hollow.

The second clamping piece 451, when force of pressing toward below the reference axis L1 is applied against the spring force of the spring force generation means 453, shifts in the pressing direction. An end face 454 of the shifting second clamping piece 451 on the tool holding jig side is arranged on the same level as that of the end face 455 of the backing member 32 on the tool holding jig side or at a position where it is shifted more than the backing member 32.

Figure 22A:
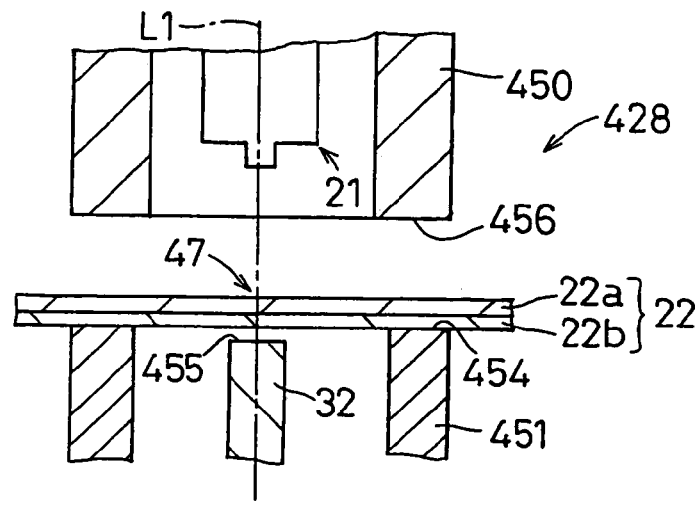
FIGS. 22A, 22B, and 22C are sectional views showing the operation of the holding means shown in FIG. 21.
Figure 22B:
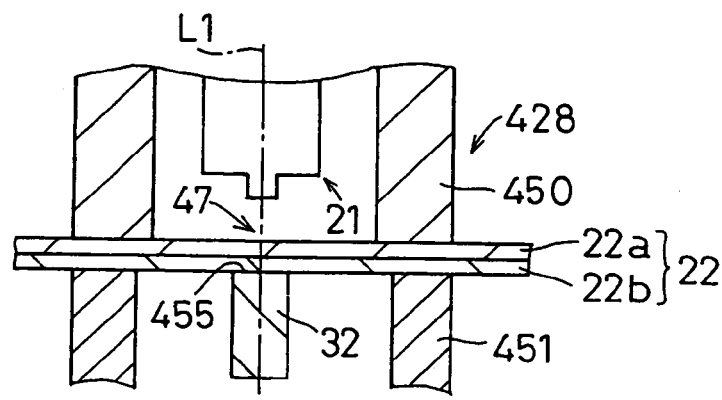
Figure 22C:
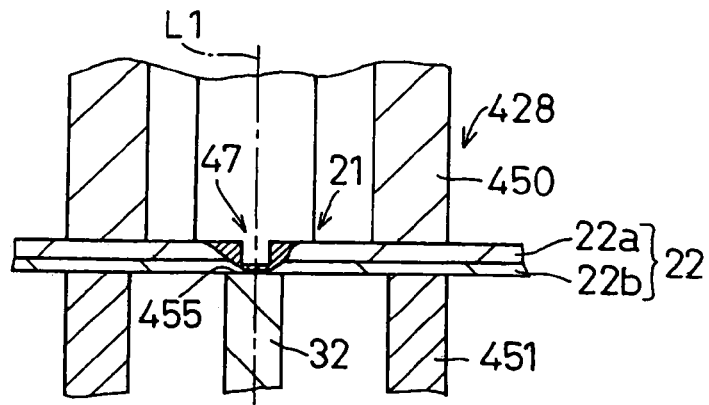

FIGS. 22A, 22B, and 22C are sectional views showing the operation of the holding means 428. As shown in FIG. 22A, on the end face 454 of the second clamping piece 451 on the tool holding jig side, the object 22 is arranged. The object 22, in the state that the part to be welded 47 is positioned by an operator so as to be arranged on the reference axis L1, is arranged on the second clamping piece 451. The second clamping piece 451 is arranged in the no-load state in the initial position when it is projected more than the backing member 32, so that the object 22 arranged on the second clamping piece 461 is arranged in the direction of the reference axis L1 at an interval from the backing member 32.

When the welding operation is started, the clamping piece driving means 452 receiving a signal from the control means 46 moves the first clamping piece 450 toward the backing member 32. The first clamping piece 450 moves toward the backing member 32 along the reference axis L1, thereby makes contact with the object 22 arranged on the second clamping piece 451.

The first clamping piece 450, in the state in contact with the object 22, additionally moves toward the backing member 32. The first clamping piece 450 moves against the spring force of the spring force generation means 453 for elastically supporting the second clamping piece 451. Therefore, the object 22 moves toward the backing member 32 in the state that it is clamped by the first clamping piece 450 and the second clamping piece 451.

As shown in FIG. 22B, in the state that the object 22 clamped and moving makes contact with the backing member 32, the clamping piece driving means 452 stops the movement of the first clamping piece 450. For example, when the control means 46 judges by a contact sensor that the object 22 makes contact with the backing member 32, it gives a signal to the clamping piece driving means 452 and stops the operation of the clamping piece driving means 452.

The first and second clamping pieces 450 and 451 cooperatively clamp and hold the object 22, prevent the object 22 from moving along the reference axially line L1, applying no excessive load causing deformation to the object 22, thereby can support the object 22 by the backing member 32. In the state that the object 22 is held free of deformation and supported by the backing member 32 like this, the welding operation shown in FIG. 5 is executed. By doing this, as shown in FIG. 22C, the welding tool 21 is buried in the object 22 and the friction stir welding operation is performed.

The control means 46, upon receipt of a welding start instruction signal, gives the signal to the clamping piece movement driving means 452 and moves the first clamping piece 450 toward the backing member 32. The control means 46, on the basis of a load torque signal from the contact sensor or the clamping piece movement driving means 452, judges whether the object 22 makes contact with the backing member 32 or not. And, when the control means 46 judges that the object 22 makes contact with the backing member 32, it give a signal to the clamping piece movement driving means 452 and stops the movement of the first clamping piece 450. Further, when the control means 46 judges that the welding operation is completed, it gives a signal to the clamping piece movement driving means 452 and moves the first clamping piece 450 so as to separate from the backing member 32.

FIGS. 23A and 23B are sectional views showing holding means 500 of a comparison example different from the holding means 428 of this embodiment. The holding means 500 of the comparison example clamps and holds the object 22 without being supported elastically in the axial direction L1. By use of such a constitution, as shown in FIG. 23A, when the object 22 is deformed, the holding means 500 cannot support the part to be welded 47 by the backing member 32 in the state that the object 22 is clamped. When the friction stir welding is executed in this state, the welding tool 21 makes contact with the tip of the object 22 in the state that it is not supported by the backing member 32. Therefore, as shown in FIG. 23B, there is the possibility that the part to be welded 47 may be deformed and the welding tool 21 may be buried in the object 22 more than a preset value and a problem arises that satisfactory welding cannot be executed.

On the other hand, in this embodiment shown in FIG. 21, the apparatus is structured so that the second clamping piece 451 is projected from the end face 455 of the backing member 32 on the tool holding jig side toward the tool holding jig 29 and is moved elastically along the reference axis L1 and at the point of time when the object 22 makes contact with the backing member 32 by the contact sensor, the, movement of the first clamping piece 450 can be stopped, so that failures as shown in FIGS. 23A and 23B will not be caused.

Namely, in this embodiment shown in FIG. 21, in the state that the object 22 is kept and held in the natural shape free of an excessive load causing deformation, the part to be welded 47 of the object 22 can be supported by the backing member 32. When the part to be welded 47 is supported by the backing member 32, the part 47 is prevented from deformation, and the welding tool 21 can be prevented from being buried in the object 22 by more than the preset value, thus satisfactory welding can be executed. Further, since the object 22 is held by the first and second clamping pieces 450 and 451, the members 22a and 22b constituting the object 22 can be prevented from shifting during welding.

Also in the friction stir welding apparatus 420 mentioned above, the same effects as those of the friction stir welding apparatus 20 shown in FIG. 1 can be obtained. Furthermore, the welding operation can be performed in the state that the object 22 is kept and held in the natural shape by the holding means 428. By doing this, the object 22 can be prevented from deformation and displacement during welding, and the welding quality can be improved.

Further, the welding operation can be performed in the state that the object 22 is clamped by the first clamping piece 450 and the second clamping piece 451 and additionally is moved and supported by the backing member 32. By doing this, clamping of the object 22 and supporting of the part to be welded 47 can be realized simultaneously and the welding quality can be more improved. Further, the first clamping piece 450 makes contact with and separates from the object 22 by the clamping piece movement driving means 452, thus the object 22 can be switched to the holding state or the release state, and the holding operation and release operation thereof can be easily performed.

Further, the part to be welded 47 and the welding tool 21 are covered by the first clamping piece 450 and the second clamping piece 451, so that during welding, the fluid object 22 can be prevented from scattering, and the operator can work safely. Even if the part to be welded 47 and the welding tool 21 are covered and the working state cannot be seen, the friction stir welding apparatus 420 can notify the operator of the working state since the end lamp 42 and the error lamp 43 notify an operator of the end of the welding operation and an error Further, when the parts of the first clamping piece 450 and the second clamping piece 451 which are opposite to each other are composed of a flexible and elastic material, even if a shape error of the object 22 is large, the object 22 can be clamped closely and surely. Further, the first clamping piece 450 and the second clamping piece 451 may be structured so as to exchange the first clamping piece 450 and the second clamping piece 451 according to the shape of the object 22. Further, the first and second clamping pieces 450 and 451 do not need to be formed cylindrically and they may be in other shapes.

Further, a spring force generation means for giving spring force for pressing the tool holding jig 29 and the first clamping piece 450 toward the backing member 32 can be installed. In this case, the first clamping piece 450 is arranged so that the end face 466 on the backing member side is projected toward the backing member 32 in the no-load state over the end of the tool holding jig 29. The spring force given to the first clamping piece 450 by the spring force generation means for the first clamping piece 450 is set larger than the spring force given to the second clamping piece 451 by the spring force generation means for the first clamping piece 451. The first clamping piece 450 is moved along the reference axis L1 together with the tool holding jig 29 without rotating about the reference axis L1. By doing this, the part to be welded 47 of the object 22 makes contact with the backing member 32 in the state that the object 22 is clamped and similarly to the aforementioned, the welding quality can be improved.

The friction stir welding apparatuses 20, 120, 220, and 420 mentioned above are just examples of the present invention and the constitution can be changed within the range of the present invention. For example, the tool rotation driving means 34 and the tool movement driving means 35 may be installed at a position away from the base 23. Further, the reference axis L1 is described as it extends vertically. However, it may extend in any direction other than the vertical direction. Further, with respect to the tool movement driving means 35, the tool holding jig 29 may be moved along the reference axis L1, or the head 24 where the tool holding jig 29 is installed may be structured movably and may be moved along the reference axis L1.

Further, in the above description, regarding the positioning means for positioning the holding jigs 228 and 238 and the table 225, the concavities 280 and 380 and the convexities 233 are installed respectively on the holding jigs 228 and 238 and the table 225. However, the relationship of concavities and convexities may be inverted. Namely, convexities may be formed in the holding jigs 228 and 328 and concavities may be formed in the table 225. Further, the concavities may be formed in a rail shape.

Further, in the aforementioned embodiment, the tool holding jig 29, on which the welding tool 21 is mounted, is rotated and moved. However, as a deformed example, a constitution may be used that the friction stir welding apparatus shown in FIG. 1 or 13 is partially changed, and the tool holding jig 29, on which the welding tool 21 is mounted, is rotated, and the backing member 32 is moved along the reference axis L1 instead of moving the tool holding jig 29.

Figure 24:
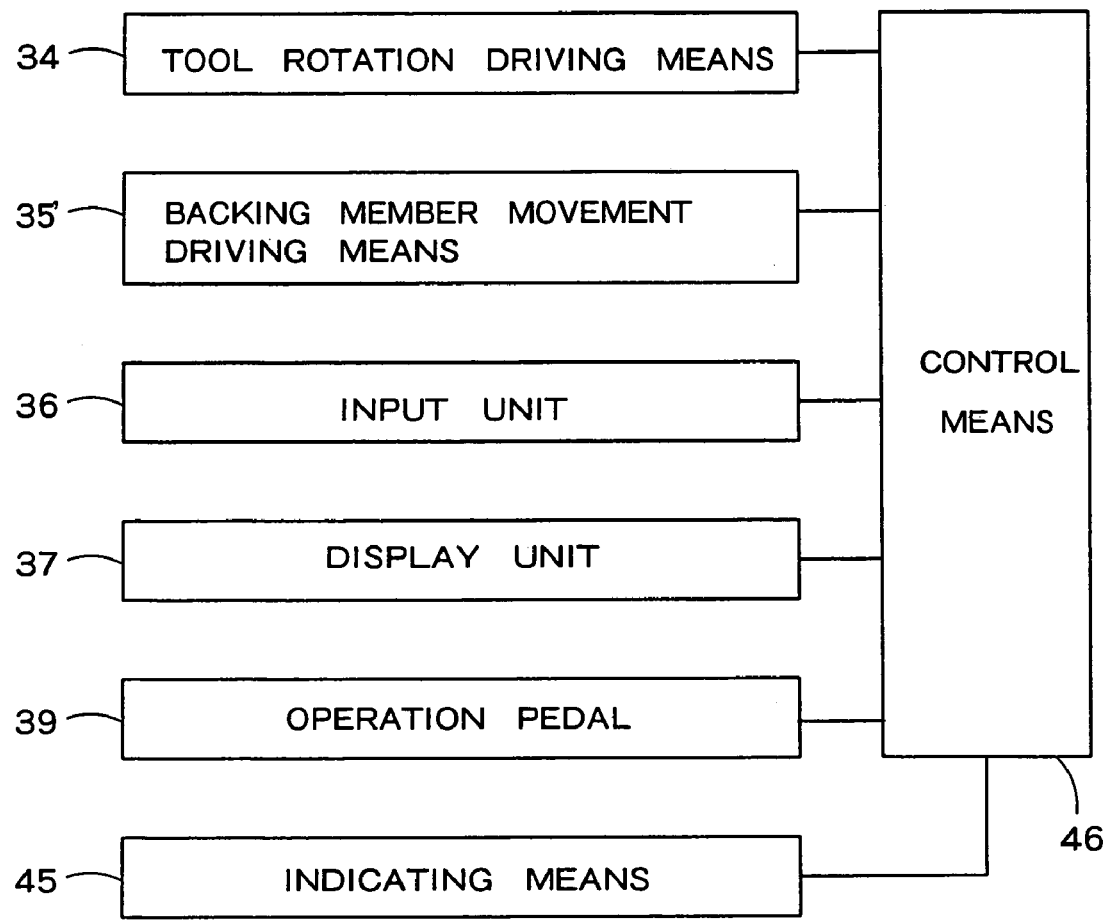
FIG. 24 is a block diagram showing the electrical constitution of the friction stir welding apparatus as a modification of the aforementioned embodiment.
Figure 25:
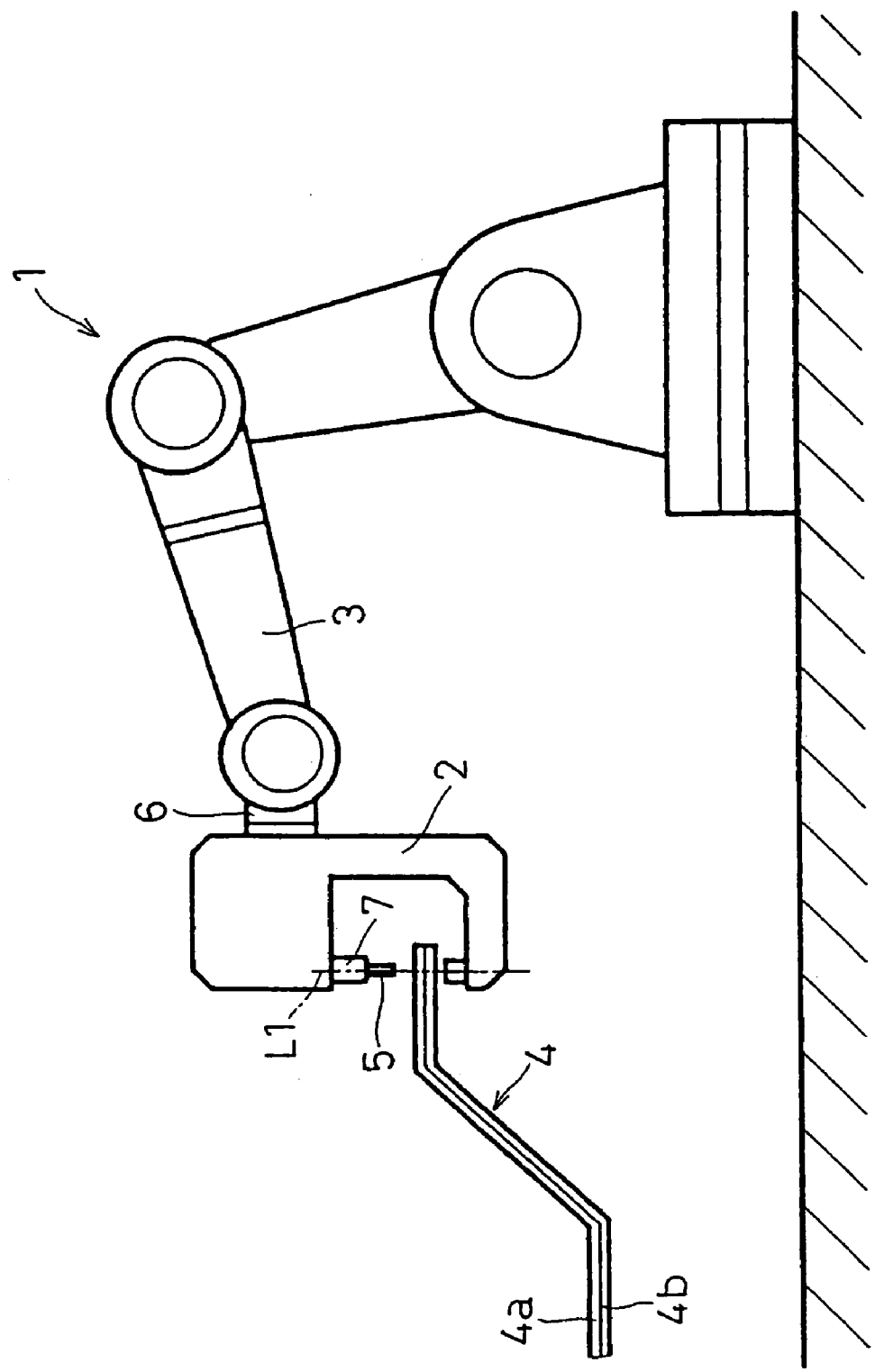
FIG. 25 is a drawing showing the friction stir welding apparatus of the prior art.

Namely, the friction stir welding apparatus in this example, as shown in FIG. 24 (and FIG. 1), includes the tool holding jig 29 mounted on the head 24, on which the welding tool 21 is rotatably installed so as to face the table 25, the tool rotation driving means 34 for rotating the tool holding means 29 about the rotation axis, the backing member 32 which is installed on the table 25 so as to move in the movement direction to approach and separate from the tool holding jig 29, and a backing member movement driving means 35' for moving the backing member along the reference axis L1. By use of such a constitution, there is no need to arrange the tool movement driving means 35 on the head side and the friction stir welding apparatus can be further miniaturized.

The invention claimed is:

1. A friction stir welding apparatus configured to spot weld an object, comprising:
   a base fixed at a predetermined position;
   a tool holding jig to which a welding tool is mounted, said tool holding jig being installed on said base rotatably about a reference axis and movably along said reference axis;
   tool rotation driving means for rotating said tool holding jig about said reference axis;
   tool movement driving means for moving said tool holding jig along said reference axis;
   positioning means, which is installed on said base, for positioning an object to be welded with respect to said reference axis; and
   holding means for holding said object to be welded with respect to said base, said positioning means positioning the holding means, wherein said holding means has a backing member for supporting a part of said object located on said reference axis from a side opposite to said welding tool, and the backing member and the tool holding jig remain axially aligned throughout a spot welding process; and
   an operation pedal which outputs a welding start instruction from an operator.

2. A friction stir welding apparatus according to claim 1, wherein said holding means comprising:
- a first clamping piece installed movably along said reference axis with respect to said base and said tool holding jig;
- clamping piece movement driving means for moving said first clamping piece along said reference axis;
- a second clamping piece for holding said object cooperatively with said first clamping piece, said second clamping piece being installed so that said second clamping piece can move along said reference axis from a projection position projecting over said backing member and a retraction position retracting with respect to said backing member, and
- spring force generation means for giving spring force toward said projection position to said second clamping piece.

3. A friction stir welding apparatus according to claim 2, wherein:
- said first clamping piece is formed so that a center axis thereof is coaxially with said reference axis;
- said second clamping piece is formed so that a center axis thereof is coaxially with said reference axis; and
- said object is clamped by an end face of said first clamping piece and an end face of said second clamping piece.

4. A friction stir welding apparatus according to claim 3, wherein said first clamping piece and said second clamping piece are formed in a cylindrical or hollow shape, respectively.

5. A friction stir welding apparatus according to claim 4, wherein:
- said backing member is installed movably along said reference axis; and
- backing member movement driving means for moving said backing member along said reference axis is installed in place of said tool movement driving means.

6. A friction stir welding apparatus according to claim 2, wherein:
- said backing member is installed movably along said reference axis; and
- backing member movement driving means for moving said backing member along said reference axis is installed in place of said tool movement driving means.

7. A friction stir welding apparatus according to claim 3, wherein:
- said backing member is installed movably along said reference axis; and
- backing member movement driving means for moving said backing member along said reference axis is installed in place of said tool movement driving means.

8. A friction stir welding apparatus according to claim 1, wherein:
- said backing member is installed movably along said reference axis; and
- backing member movement driving means for moving said backing member along said reference axis is installed in place of said tool movement driving means.

9. A friction stir welding apparatus according to claim 1, wherein the positioning means, the holding means, and the backing member form a table for holding the object to be welded.

10. A friction stir welding apparatus configured to spot weld an object, comprising:
- a base fixed at a predetermined position;
- a tool holding jig to which a welding tool is mounted, said tool holding jig being installed on said base rotatably about a reference axis and movably along said reference axis;
- tool rotation driving means for rotating said tool holding jig about said reference axis;
- tool movement driving means for moving said tool holding jig along said reference axis; and
- holding means, which is installed on said base, for holding an object to be welded, wherein said holding means has a backing member for supporting a part of said object located on said reference axis from a side opposite to said welding tool, and the backing member and the tool holding jig remain axially aligned throughout a spot welding process; and
- an operation pedal which outputs a welding start instruction from an operator.

11. A friction stir welding apparatus according to claim 10, wherein the holding means and the backing member form a table for holding the object to be welded.

* * * * *